United States Patent
Garcia, Jr. et al.

(10) Patent No.: US 8,711,736 B2
(45) Date of Patent: Apr. 29, 2014

(54) AUDIO PROCESSING IN A MULTI-PARTICIPANT CONFERENCE

(75) Inventors: Roberto Garcia, Jr., Sunnyvale, CA (US); Hyeonkuk Jeong, Saratoga, CA (US); Nirav Patel, Sunnyvale, CA (US); Berkat S. Tung, Rancho Cordova, CA (US); Joe S. Abuan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 12/884,129

(22) Filed: Sep. 16, 2010

(65) Prior Publication Data

US 2012/0069134 A1     Mar. 22, 2012

(51) Int. Cl.
*H04Q 11/00* (2006.01)
*H04M 3/56* (2006.01)
*H04N 7/15* (2006.01)

(52) U.S. Cl.
CPC ............... *H04M 3/561* (2013.01); *H04N 7/15* (2013.01)
USPC ..................... 370/260; 379/202.01

(58) Field of Classification Search
CPC ......... H04N 7/15; H04N 7/152; H04N 7/147; H04N 21/44222; H04N 7/141; H04N 21/4788; H04M 3/56; H04L 29/06; H04L 12/18
USPC .......................... 370/259–271; 379/157–158, 379/202.01–205.01
See application file for complete search history.

(56) References Cited

U.S. PATENT DOCUMENTS

| | | |
|---|---|---|
| 4,847,829 A | 7/1989 | Tompkins et al. |
| 5,513,182 A | 4/1996 | Kawamura et al. |
| 5,533,112 A | 7/1996 | Danneels |
| 5,548,346 A | 8/1996 | Mimura et al. |
| 5,604,738 A | 2/1997 | Shibata et al. |
| 5,646,678 A | 7/1997 | Bonja et al. |
| 5,838,664 A | 11/1998 | Polomski |
| 5,896,128 A | 4/1999 | Boyer |

(Continued)

FOREIGN PATENT DOCUMENTS

| | | |
|---|---|---|
| EP | 0 744 857 | 11/1996 |
| EP | 1 875 769 | 1/2008 |

(Continued)

OTHER PUBLICATIONS

Updated portions of prosecution history of U.S. Appl. No. 13/099,331, Mar. 21, 2012, Jeong, Hyeonkuk, et al.

(Continued)

*Primary Examiner* — Ayaz Sheikh
*Assistant Examiner* — Mounir Moutaouakil
(74) *Attorney, Agent, or Firm* — Blakely, Sokoloff, Taylor & Zafman LLP

(57) ABSTRACT

A first computing device distributes audio signals to several computing devices of participants in a communication session. In some embodiments, the first computing device serves as a central distributor for receiving audio signals from other computing devices, compositing the audio signals and distributing the composited audio signals to the other computing devices. The first computing device prioritizes the received audio signals based on a set of criteria and selects several highly prioritized audio signals. The first computing device generates composite audio signals using only the selected audio signals. The first computing device sends each computing device the composited audio signal for the device. In some cases, the first computing device sends a selected audio signal to another computing device without mixing the signal with any other audio signal.

25 Claims, 20 Drawing Sheets

(56) References Cited

U.S. PATENT DOCUMENTS

| | | |
|---|---|---|
| 5,933,417 A | 8/1999 | Rottoo |
| 5,936,662 A | 8/1999 | Kim et al. |
| 5,953,049 A | 9/1999 | Horn et al. |
| 6,008,838 A | 12/1999 | Iizawa |
| 6,167,033 A | 12/2000 | Chang et al. |
| 6,167,432 A | 12/2000 | Jiang |
| 6,496,216 B2 | 12/2002 | Feder et al. |
| 6,624,841 B1 | 9/2003 | Buchner et al. |
| 6,633,985 B2 | 10/2003 | Drell |
| 6,697,341 B1 | 2/2004 | Roy |
| 6,697,476 B1 | 2/2004 | O'Malley et al. |
| 6,711,212 B1 | 3/2004 | Lin |
| 6,728,221 B1 | 4/2004 | Shaffer et al. |
| 6,744,460 B1 | 6/2004 | Nimri et al. |
| 6,757,005 B1 | 6/2004 | Elbaz et al. |
| 6,760,749 B1 | 7/2004 | Dunlap et al. |
| 6,882,971 B2 | 4/2005 | Craner |
| 6,915,331 B2 | 7/2005 | Fuller et al. |
| 6,989,856 B2 | 1/2006 | Firestone et al. |
| 7,096,037 B2 | 8/2006 | Canova, Jr. et al. |
| 7,266,091 B2 | 9/2007 | Singh et al. |
| 7,280,492 B2 | 10/2007 | Magnuski |
| 7,313,593 B1 | 12/2007 | Pulito et al. |
| 7,321,382 B2 | 1/2008 | Okajima et al. |
| 7,328,240 B2 | 2/2008 | El-Gebaly et al. |
| 7,362,349 B2 | 4/2008 | Nelson et al. |
| 7,379,450 B2 | 5/2008 | Gu et al. |
| 7,421,471 B2 | 9/2008 | Van Datta |
| 7,454,460 B2 | 11/2008 | Ivashin |
| 7,474,326 B2 | 1/2009 | Le Pennec |
| 7,474,634 B1 | 1/2009 | Webster et al. |
| 7,492,387 B2 | 2/2009 | Yang et al. |
| 7,522,719 B2 * | 4/2009 | Carlson et al. ............ 379/202.01 |
| 7,577,110 B2 | 8/2009 | Zimmermann et al. |
| 7,606,181 B1 | 10/2009 | Whynot et al. |
| 7,627,678 B2 | 12/2009 | Datta et al. |
| 7,653,250 B2 | 1/2010 | Jeong et al. |
| 7,692,682 B2 | 4/2010 | Pun et al. |
| 7,817,180 B2 | 10/2010 | Jeong et al. |
| 7,864,209 B2 | 1/2011 | Jeong et al. |
| 7,881,235 B1 | 2/2011 | Arthur et al. |
| 7,899,170 B2 * | 3/2011 | Jeong et al. ............... 379/202.01 |
| 7,949,117 B2 | 5/2011 | Jeong et al. |
| 2001/0019354 A1 | 9/2001 | Einarsson et al. |
| 2002/0126626 A1 | 9/2002 | Singh et al. |
| 2002/0154210 A1 | 10/2002 | Ludwig et al. |
| 2003/0063573 A1 * | 4/2003 | Vandermersch ............. 370/260 |
| 2003/0217158 A1 | 11/2003 | Datta |
| 2004/0022202 A1 | 2/2004 | Yang et al. |
| 2004/0028199 A1 | 2/2004 | Carlson |
| 2004/0215722 A1 | 10/2004 | Mukherjee |
| 2005/0018828 A1 | 1/2005 | Nierhaus et al. |
| 2005/0097169 A1 | 5/2005 | Mukherjee et al. |
| 2005/0099492 A1 | 5/2005 | Orr |
| 2005/0286443 A1 | 12/2005 | McMillen et al. |
| 2006/0029092 A1 | 2/2006 | Luo et al. |
| 2006/0146737 A1 | 7/2006 | Ohrstrom Sandgren et al. |
| 2006/0187860 A1 | 8/2006 | Li |
| 2006/0244812 A1 | 11/2006 | Jeong et al. |
| 2006/0245377 A1 | 11/2006 | Jeong et al. |
| 2006/0245378 A1 | 11/2006 | Jeong et al. |
| 2006/0245379 A1 | 11/2006 | Abuan et al. |
| 2006/0247045 A1 * | 11/2006 | Jeong et al. ..................... 463/35 |
| 2007/0201381 A1 | 8/2007 | Ekl et al. |
| 2009/0168984 A1 * | 7/2009 | Kreiner et al. ............ 379/202.01 |
| 2009/0252315 A1 | 10/2009 | Ratmanski et al. |
| 2010/0017606 A1 | 1/2010 | Bradley et al. |
| 2010/0080374 A1 * | 4/2010 | Hepworth et al. ....... 379/202.01 |
| 2010/0189178 A1 | 7/2010 | Pun et al. |
| 2010/0321469 A1 | 12/2010 | Jeong et al. |
| 2011/0074914 A1 | 3/2011 | Jeong et al. |
| 2011/0116409 A1 | 5/2011 | Jeong et al. |
| 2011/0205332 A1 | 8/2011 | Jeong et al. |
| 2011/0252090 A1 | 10/2011 | Garcia, Jr. et al. |
| 2011/0252157 A1 | 10/2011 | Garcia, Jr. et al. |
| 2011/0252319 A1 | 10/2011 | Garcia, Jr. et al. |
| 2012/0002002 A1 * | 1/2012 | Shaffer et al. .............. 348/14.09 |

FOREIGN PATENT DOCUMENTS

| | | |
|---|---|---|
| EP | 1 877 148 | 1/2008 |
| EP | 1 878 229 | 1/2008 |
| EP | 1 936 996 | 6/2008 |
| EP | 11192109 | 12/2011 |
| EP | 11192110 | 12/2011 |
| EP | 2439945 | 4/2012 |
| EP | 12164796 | 4/2012 |
| EP | 2457625 | 5/2012 |
| GB | 2 313 250 | 11/1997 |
| JP | 2001-128132 | 5/2001 |
| WO | WO 99/62259 | 12/1999 |
| WO | WO 2006/116644 | 11/2006 |
| WO | WO 2006/116659 | 11/2006 |
| WO | WO 2006/116750 | 11/2006 |

OTHER PUBLICATIONS

Updated portions of prosecution history of U.S. Appl. No. 12/702,287, Feb. 3, 2012, Pun, Thomas, et al.

Updated portions of prosecution history of EP06769904, Dec. 27, 2011 (mailing date), Apple Inc.

Portions of prosecution history of EP11192109, Mar. 8, 2012 (mailing date), Apple Inc.

Updated portions of prosecution history of EP06758716, Jan. 25, 2012 (filing date), Apple Inc.

Updated portions of prosecution history of EP08075236, Jan. 26, 2012 (filing date), Apple Inc.

Portions of prosecution history of U.S. Appl. No. 13/011,848, Mar. 29, 2012, Jeong, Hyeonkuk, et al.

Updated portions of prosecution history of U.S. Appl. No. 13/099,331, Apr. 2, 2012, Jeong, Hyeonkuk, et al.

Updated portions of prosecution history of U.S. Appl. No. 12/702,287, May 3, 2012, Pun, Thomas, et al.

Portions of prosecution history of U.S. Appl. No. 12/832,057, Jun. 21, 2011, Garcia, Jr., Robert, et al.

Portions of prosecution history of U.S. Appl. No. 12/832,046, Jun. 21, 2011, Garcia, Jr., Robert, et al.

Portions of prosecution history of U.S. Appl. No. 12/832,049, Jun. 21, 2011, Garcia, Jr., Robert, et al.

Portions of prosecution history of EP11192110, Apr. 25, 2012 (mailing date), Apple Inc.

Updated portions of prosecution history of U.S. Appl. No. 11/118,932, Jun. 13, 2012, Abuan, Joe, et al.

Portions of prosecution history of U.S. Appl. No. 12/870,780, Jun. 13, 2012, Jeong, Hyeonkuk, et al.

Updated portions of prosecution history of U.S. Appl. No. 12/702,287, May 25, 2012 Pun, Thomas, et al.

Updated portions of prosecution history of U.S. Appl. No. 12/832,057, May 24, 2012, Garcia, Jr., Roberto, et al.

U.S. Appl. No. 13/099,331, filed May 2, 2011, Jeong, Hyeonkuk, et al.

Updated portions of prosecution history of U.S. Appl. No. 11/118,931, Jan. 14, 2011, Jeong, Hyeonkuk, et al.

Updated portions of prosecution history of U.S. Appl. No. 11/118,554, Dec. 9, 2009, Jeong, Hyeonkuk, et al.

Updated portions of prosecution history of U.S. Appl. No. 11/118,555, Dec. 2, 2010, Jeong, Hyeonkuk, et al.

Portions of prosecution history of U.S. Appl. No. 12/955,902, Jan. 24, 2011, Jeong, Hyeonkuk, et al.

Updated portions of prosecution history of U.S. Appl. No. 11/118,297, Apr. 21, 2011, Jeong, Hyeonkuk, et al.

Portions of Prosecution history of U.S. Appl. No. 13/099,331, Jun. 2, 2011, Jeong, Hyeonkuk, et al.

Updated portions of prosecution history of U.S. Appl. No. 11/118,553, Sep. 21, 2010, Jeong, Hyeonkuk, et al.

Updated portions of prosecution history of U.S. Appl. No. 11/118,615, Feb. 16, 2010, Pun, Thomas, et al.

(56) References Cited

OTHER PUBLICATIONS

Portions of prosecution history of U.S. Appl. No. 12/702,287, Nov. 5, 2010, Pun, Thomas, et al.
Portions of prosecution history of EP 06769904.1, Feb. 23, 2011, Apple Inc.
Updated portions of prosecution history of EP 06751923.1, Feb. 18, 2010, Apple Inc.
Thom, Gary, A., "H.323: The Multimedia Communications Standard for Local Area Networks," IEEE Communications Magazines, Dec. 1, 1996, pp. 52-56, vol. 34, No. 12, IEEE.
Portions of prosecution history of EP 06758716.2, Jun. 28, 2011, Apple Inc.
Portions of prosecution history of EP 08075236.3, Jun. 28, 2011, Apple Inc.
U.S. Appl. No. 13/543,733, filed Jul. 6, 2012, Jeong, Hyeonkuk, et al.
Updated portions of prosecution history of U.S. Appl. No. 13/011,848, Jun. 27, 2012, Jeong, Hyeonkuk, et al.
Updated portions of prosecution history of U.S. Appl. No. 13/099,331, Jul. 9, 2012, Jeong, Hyeonkuk, et al.
Updated portions of prosecution history of U.S. Appl. No. 12/870,780, Jul. 10, 2012, Jeong, Hyeonkuk, et al.
Updated portions of prosecution history of U.S. Appl. No. 12/702,287, Jul. 19, 2012, Pun, Thomas, et al.
Portions of prosecution history of EP12164796, Jun. 27, 2012, Apple Inc.
U.S. Appl. No. 10/877,507, filed Jun. 25, 2004, Arthur, Bruce, et al.
U.S. Appl. No. 12/643,958, filed Dec. 21, 2009, Jeong, Hyeonkuk, et al.
U.S. Appl. No. 12/832,046, filed Jul. 7, 2010, Garcia Jr., Roberto, et al.
U.S. Appl. No. 12/832,049, filed Jul. 7, 2010, Garcia Jr., Roberto, et al.
U.S. Appl. No. 12/832,057, filed Jul. 7, 2010, Garcia Jr., Roberto, et al.
U.S. Appl. No. 12/870,780, filed Aug. 27, 2010, Jeong, Hyeonkuk, et al.
Portions of prosecution of U.S. Appl. No. 11/118,931, Oct. 1, 2010, Jeong, Hyeonkuk, et al.
Portions of prosecution history of U.S. Appl. No. 11/118,554, Dec. 1, 2009, Jeong, Hyeonkuk, et al.
Portions of prosecution history of U.S. Appl. No. 11/118,932, Mar. 24, 2010, Abuan, Joe, et al.
Portions of prosecution history of U.S. Appl. No. 11/118,555, Aug. 2, 2010, Jeong, Hyeonkuk, et al.
Portions of prosecution history of U.S. Appl. No. 11/118,297, Jul. 30, 2010, Jeong, Hyeonkuk, et al.
Portions of prosecution history of U.S. Appl. No. 11/118,553, Sep. 9, 2010, Jeong, Hyeonkuk, et al.
International Search Report and Written Opinion of PCT/US2006/016123, Sep. 26, 2008 (mailing date), Apple Computer, Inc.
Portions of prosecution history of U.S. Appl. No. 11/118,615, Jan. 12, 2010, Pun, Thomas, et al.
International Preliminary Report on Patentability of PCT/US2006/016123, Apr. 28, 2009, (issuance date), Apple Computer, Inc.
International Search Report and Written Opinion of PCT/US2006/016469, Sep. 18, 2006 (mailing date), Apple Computer, Inc.
International Preliminary Report on Patentability of PCT/US2006/016469, Oct. 30, 2007 (issuance date), Apple Computer, Inc.
EP Search Report of EP 06 75 1923.1, Oct. 14, 2009 (mailing date), Apple Computer, Inc.
International Search Report and Written Opinion of PCT/US2006/016169, Oct. 16, 2008 (mailing date), Apple Computer, Inc.
International Preliminary Report on Patentability of PCT/US2006/016169, Nov. 27, 2008 (issuance date), Apple Computer, Inc.
Triebel, Tonio, et al., "Peer-to-peer Voice Communication for Massively Multiplayer Online Games", 6$^{th}$ IEEE Conference on Consumer Communications and Networking Conference, Jan. 10-13, 2009, pp. 1-5.

\* cited by examiner

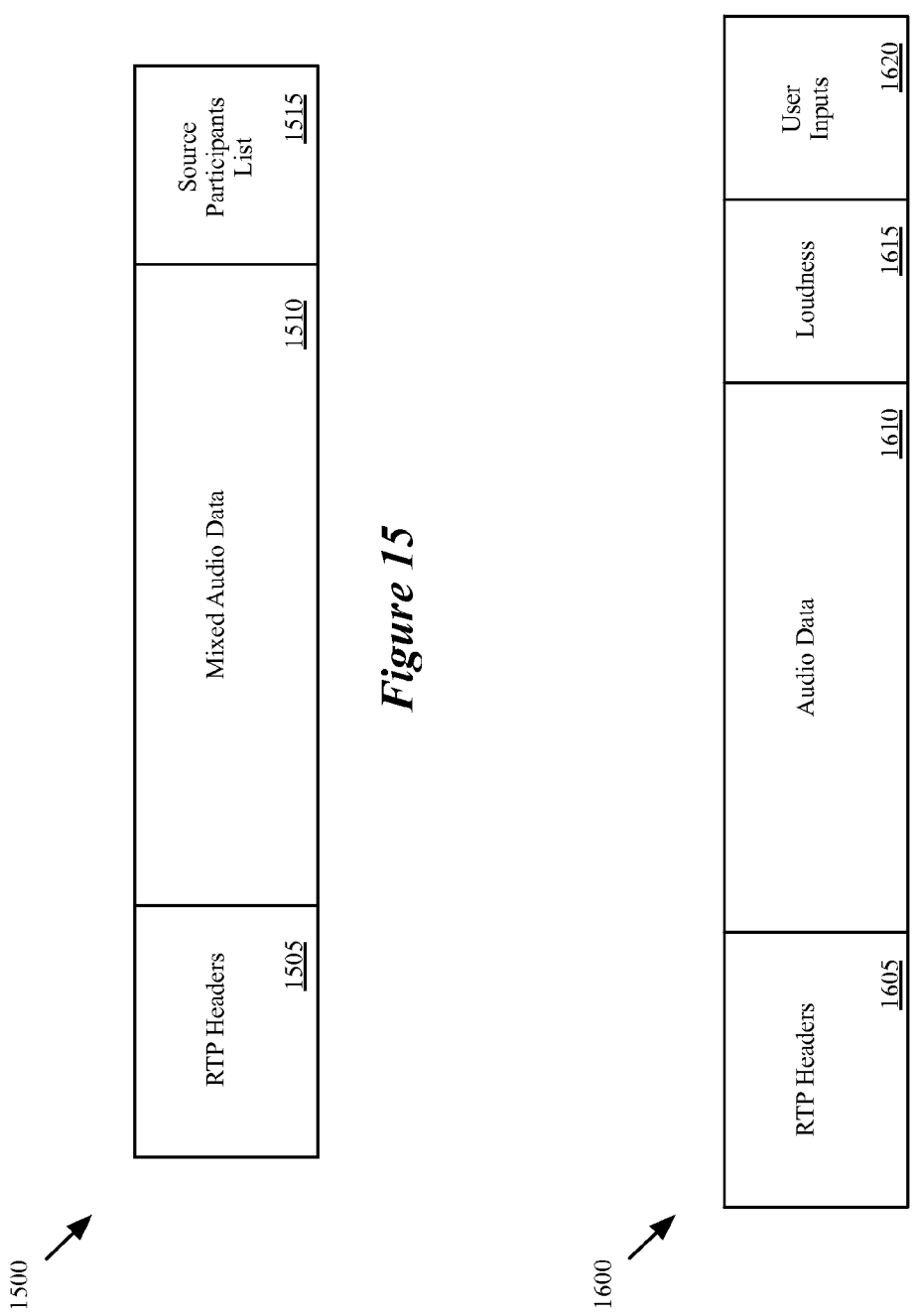

AUDIO PROCESSING IN A MULTI-PARTICIPANT CONFERENCE

BACKGROUND

Many different types of computing devices exist today. Examples of such computing devices include desktops, laptops, netbooks, tablets, e-readers, smart phones, etc. These computing devices often are interconnected with each other through local and wide area networks (e.g., the Internet) that allow the users of these computing devices to participate in multi-participant activities. Online gaming is one type of multi-participant activity.

It is often desirable or necessary that the users participating in a multi-participant activity communicate with each other during the activity. A video or audio conference is a convenient way of communication between the users. Several approaches are possible for these multi-participant conferencing. One such approach is having a server gather audio/video data from all the participants in a conference and distribute the gathered data back to the participants. Another approach is having the participants exchange the audio/video data among each other using their interconnected computing devices without relying on a server. Yet another approach is having one participant's computing device gather and distribute audio/video data from and to other participants' computing devices.

An example of the third approach is a focus point network. In a multi-participant conference conducted through the focus point network, a computing device of one of the participants serves as a central distributor of audio and/or video content. The central distributor receives audio/video data from the other computing device in the audio conference, processes the received audio/video data along with audio/video data captured locally at the central distributor, and distributes the processed data to the other computing devices. The central distributor of a focus network is referred to as the focus computing device or the focus device, while the other computing devices are referred to as non-focus computing devices or non-focus devices.

FIG. 1 shows an example of the data exchange between computing devices in an audio conference that is being conducted through a focus point network. Specifically, FIG. 1 illustrates audio data exchange for five computing devices 110-130 (of five participants A, B, C, D and E) in the audio conference. In this example, the computing device 110 (of the participant A) is the focus device. The computing device 110 receives the audio signals 135-150 from the computing devices 115-130, composites the received signals, and distributes the composite signals 155-170 to the computing devices 115-130. The computing device 115-130 are non-focus devices. These computing devices send their audio signals 135-150 to the focus device 110 and receive the composite audio signals 155-170 from the focus device 110. Each of the audio signals 135-150 contains audio content from one of the participants of the audio conference, whereas the composite audio signals 155-170 contain audio content from the participants after this content has been composited (e.g., mixed) by the computing device 110.

BRIEF SUMMARY

Some embodiments provide a method for distributing audio signals among several computing devices of several participants in a communication session. These embodiments have a computing device of one of the participants designated as a central distributor that receives audio signals from the other computing devices of the other participants in the communication session. The central distributor generates a composite signal for each participant using the received signals. To generate each of these signals, the central distributor performs a number of audio processing operations (e.g., decoding, buffering, mixing, encoding, etc.). Some of these operations are especially costly, in that their performance consumes substantial computational resources (e.g., CPU cycles, memory, etc.) of the central distributor.

The central distributor of some embodiments improves its audio processing performance by limiting the number of audio signals it uses to generate mixed audio signals. To limit the number of audio signals it uses, the central distributor of some embodiments only uses a subset of the received audio signals. To identify the subset, the central distributor of some embodiments uses a set of criteria to prioritize the audio signals. Some of the criteria that the central distributor uses to prioritize the signals are heuristic-based. For example, some embodiments use as the criteria (1) the volume level of the audio data from each participant, and (2) the duration that the audio data's volume level exceeds a particular threshold. In this manner, the central distributor identifies the audio signals of the participants who have been speaking louder and for longer periods of time as the audio signals that it uses.

Instead of or in conjunction with limiting the number of audio signals it uses, the central distributor of some embodiments uses the silence of one of the participants, or the muting of one of the participants by other participants, to reduce the audio processing operations. The reduction in audio processing operations in some embodiments might entail reduction of the number of audio processing pipelines or reduction in the number of audio processing operations performed by the pipelines.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 15 illustrates an example of audio data packet used by a focus point module in some embodiments to transmit audio content.

FIG. 16 illustrates an example of audio data packet used by a non-focus point module in some embodiments to transmit audio content.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

A focus point device of some embodiments improves its audio processing performance by limiting the number of received audio signals it uses to generate composite audio signals. To limit the number of the audio signals it uses, the focus device of some embodiments prioritizes all the received audio signals based on a set of criteria and uses only the high-priority audio signals to generate composite audio signals. The focus device of some embodiments deems the lowly prioritized audio signals as audio signals from silent participants and hence does not use these low-priority signals when generating composite signals.

Figure 1:
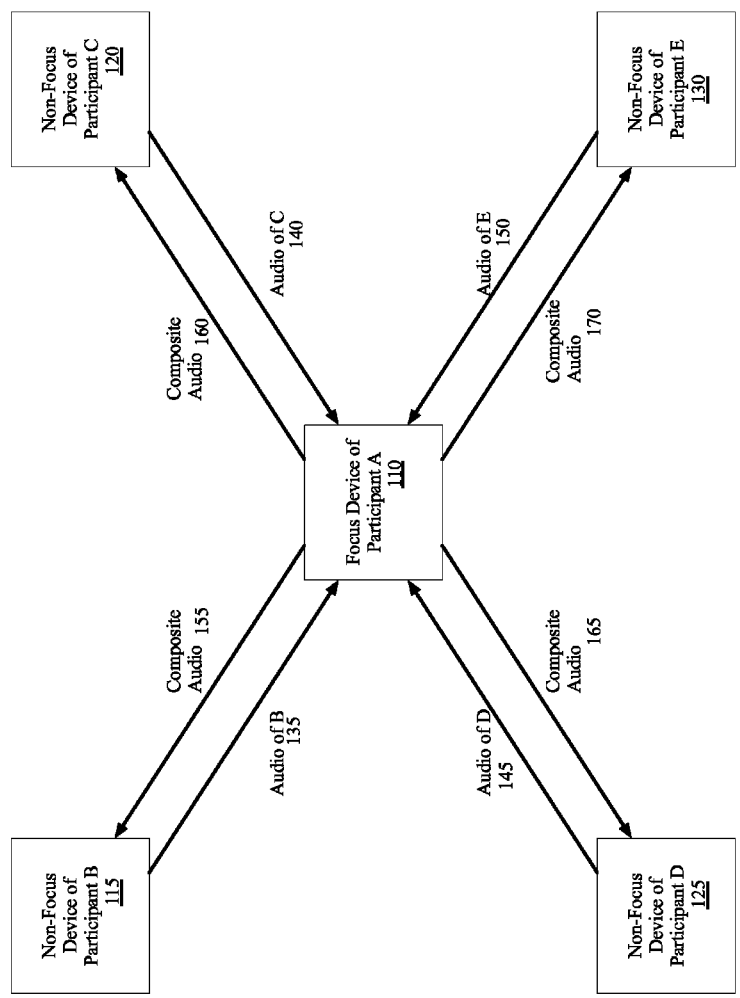
FIG. 1 illustrates a multi-participant audio conference of some embodiments.
Figure 2:
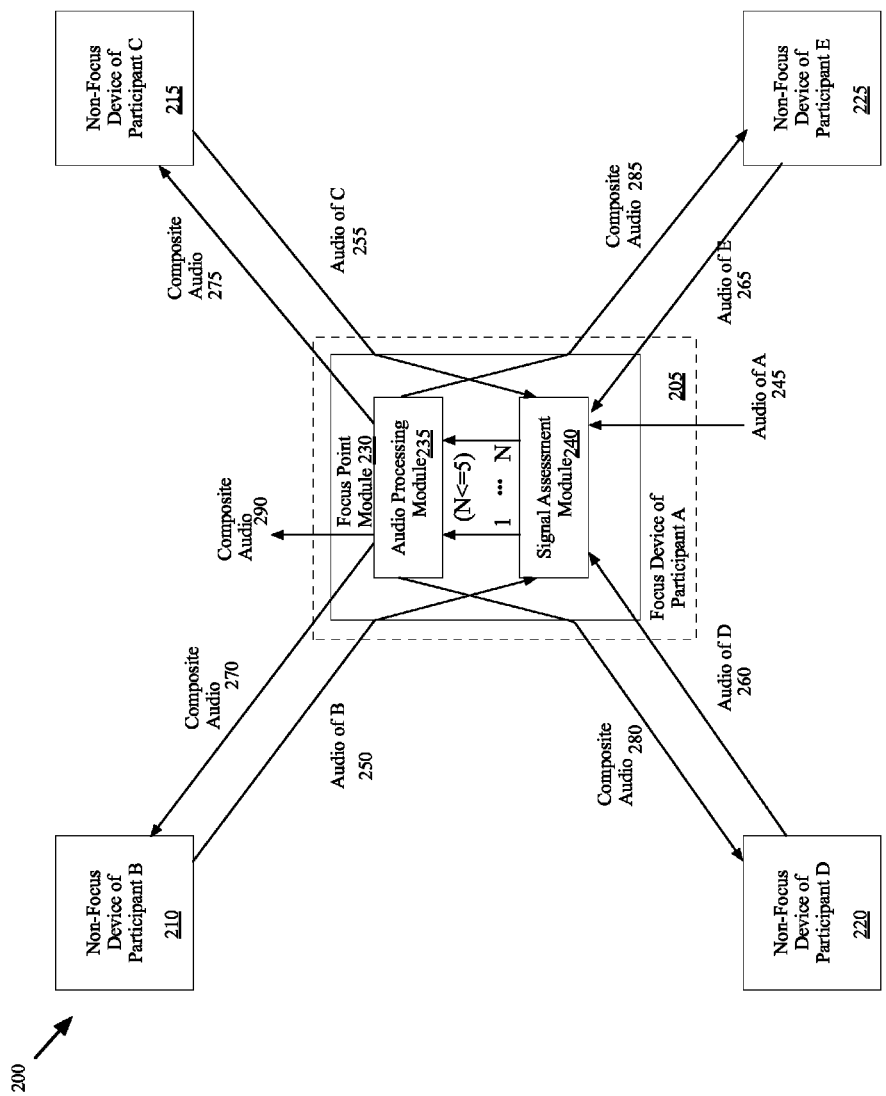
FIG. 2 illustrates a multi-participant audio conference of some embodiments.

For some embodiments of the invention, FIG. 2 conceptually illustrates one such focus point device 205 that improves its audio processing performance by limiting the number of received audio signals it uses to generate composite audio signals. This device is part of a focus point network 200 that is used in some embodiments to exchange audio data among five computing devices 205-225 of five participants A, B, C, D, and E in an audio conference. The focus device 205 generates the composite audio signals 270-285 from only a subset of the audio signals 245-265 that it receives from the remote non-focus computing device 210-225 of the participants B, C, D, and E and that it captures from local participant A.

As shown in FIG. 2, the focus device 205 includes a focus point module 230. This module receives the audio signals 250-265 from the non-focus computing devices 210-225, composites the received audio signals along with the locally captured audio signal 245, distributes the composite audio signals 270-285 to the computing devices 210-225, and provides a local playback of the composite audio signal 290.

As further shown, the focus point module 230 includes (1) an audio processing module 235 that generates composite audio signals, and (2) a signal assessment module 240 that limits the number of participant audio signals used to generate the composite audio signals. The signal assessment module 240 assesses the audio signals from all the participants to identify signals for the audio processing module 235 to use when generating composite audio signals to send to the participants. The signal assessment module 240 performs this assessment differently in different embodiments. In some embodiments, this module directly analyzes some or all participant's audio signals to make its assessment. In conjunction or instead of this direct analysis, the assessment module of some embodiments analyzes metadata accompanying the audio signals to make its assessment.

In some embodiments, the signal assessment module 240 identifies a subset of N audio signals for the processing module 235 to process, where N is a number smaller than the total number of audio signals that the focus point module 230 received. The total number of the received audio signals is equal to the number of participants participating in the audio conference, which, in this example, is five (including the participant A who is using the focus device 205 to participate in the audio conference).

In some embodiments, the number N is determined based on the focus device's processing capacity. The focus device's processing capacity relates to computational resources of the focus device (e.g., the central processing unit cycles, memory, etc.), which, in some embodiments, are detected by a device assessor as further described below. The computational resources of the focus device are often being utilized by not only the focus point module's audio processing operations but also by other activities (e.g., other multi-participant activities, such as multi-player game) that are concurrently performed by the focus computing device 205. As the computational resources that the focus device spends to process (e.g., composite) the received audio signals are proportional to the amount of audio data it has to process, reducing the number of received signals to process saves computational resources. The saved resources can be spent on running other activities on the focus computing device 205 (e.g., on the execution of other multi-participant applications).

To identify the N audio signals to process, the signal assessment module 240 in some embodiments prioritizes the received signals based on a set of criteria. An example criterion is loudness of the signals. In some embodiments, the signals from the participants who are speaking louder than other participants will be prioritized higher. Other criteria that some embodiments use to prioritize the signals are how long the participants have been speaking and whether the participants are speaking or otherwise making noise. One of ordinary skill in the art will recognize that any other suitable criteria may be used to prioritize the signals. For instance, unique identifications of audio signals can be used to prioritize the audio signals.

The audio processing module 235 of the focus point module 230 generates composite audio signals using the N audio signals, and sends the composite signals to the participants in the audio conference. As mentioned above, the computational resources of the focus device that audio processing module 235 spends to process audio signals are proportional to the amount of audio data in the signals that the module has to process. When the number of received signals for processing is reduced, the audio processing module 235 consumes less computational resources of the focus device.

Figure 3:
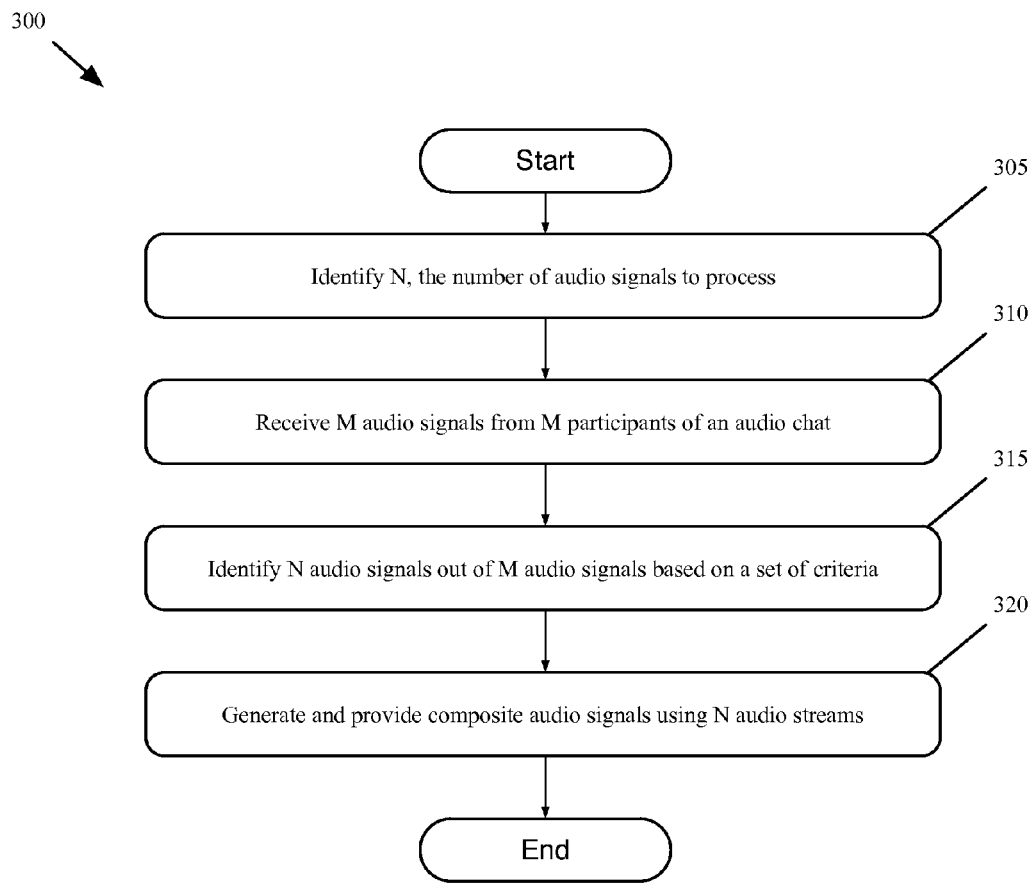
FIG. 3 conceptually illustrates an example of a process that some embodiments use to process audio signals.

The operation of the focus point module 230 of the focus device will now be described by reference to FIG. 3. FIG. 3 conceptually illustrates a compositing process 300 that the focus point module 230 performs in some embodiments. This process 300 limits the number of received audio signals that are used to generate composite audio signals. The process 300 starts when the audio conference begins.

As shown in FIG. 3, the process starts by identifying (at 305) the number N of audio streams that the audio processing module 235 can process based on the available computational resources of the focus device 205. A device assessor (not shown) of the focus point module 230 performs this operation in some embodiments, as mentioned above. Some embodiments identify the number of audio streams to process at the start of an audio conference. Other embodiments perform this operation repeatedly during the audio conference in order to adjust the number N of audio streams upwards or downwards as the less or more computational resources are being consumed during the conference by the focus point module and/or other applications running on the focus device 205. In the example illustrate by FIG. 2, N is a three.

Next, the process 300 starts to receive (at 310) M audio signals from M participants of an audio conference, where M is a number. FIG. 2 illustrates that the non-focus devices 210-230 send their audio signals 250-265 to the focus point computing device 205 through a network (e.g., through the Internet). In addition, this figure illustrates the focus device 205 locally capturing audio signals from participant A. As such, in the example illustrated by FIG. 2, M is a five.

The process 300 then identifies (at 315) N audio signals out of M audio signals based on a set of criteria. As mentioned above, the signal assessment module 240 in some embodiments is the module that identifies the N audio signals based on the set of criteria. In some embodiments, the signal assessment unit 240 prioritizes the signals based on the average volume level of the audio content in each participant's audio signal. In case of a tie between the average volume levels of two or more participants, some of these embodiments also examine the duration of the uninterrupted audio content in the participant's audio signals. The signal assessment 240 in the example identifies the top three priority signals as the signals to process.

Next, the process 300 starts (at 320) to generate one or more composite audio streams using the identified N audio signals. In the example illustrated by FIG. 2, the audio processing module 235 of the focus point module 230 unit generates composite audio streams 270-290 using the three signals identified by the signal assessment module 240.

At 320, the process 300 also sends the composite audio streams to the remote participants in the audio conference through a network (e.g., through the Internet), and provides local playback of one composite audio stream at the focus device 205. FIG. 2 illustrates the audio processing module 235 transmitting the composite streams 270-285 to the non-focus computing devices 210-225, respectively. It also illustrates this module providing the composite stream 290 for local playback by the focus point module 230.

The process 300 stops providing the composite audio streams and ends, once the focus point audio conference ends.

Section I below describes several more examples of a focus point module to illustrate different ways of saving computational resources of a focus device. Section II then describes the architecture of a focus point module of some embodiments. Section III follows this with a description of conceptual processes that the audio processing modules perform. Next, Section IV describes the operations performed by a non-focus point module and audio data packets. Section V then describes the use of the optimized focus-point audio processing of some embodiments in a dual network environment that uses a mesh network to relay game data during a multi-participant game, and the focus-point network to relay audio conference data during the game. Section VI follows this with a description of the software architecture of a computing device of some embodiments. Section VII then describes Application Programming Interfaces that some embodiments of the invention may be implemented in. Finally, Section VIII describes a computing device that implements some embodiments of the invention.

I. EXAMPLES

Figure 4:
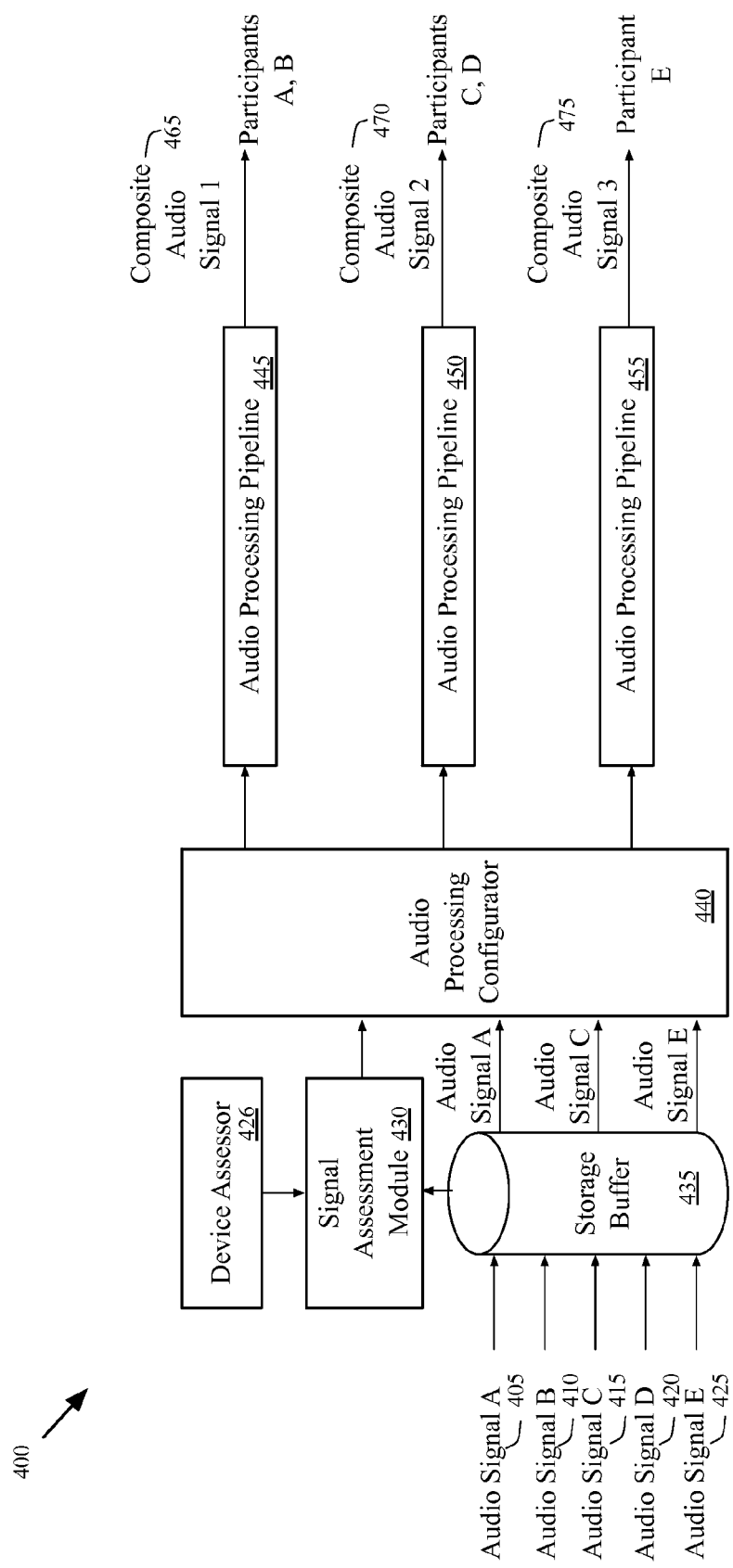
FIG. 4 illustrates a focus point module of some embodiments.

FIG. 4 illustrates an example of the audio processing operations that are performed by the focus point module 400 of a focus device of some embodiments. This focus point module improves its performance by using only a subset of the audio signals it receives from the participants. As shown, the focus point module 400 includes a device assessor 426, a signal assessment module 430, a storage buffer 435, an audio processing configurator 440, and three audio processing pipelines 445-455.

As shown in FIG. 4, the focus point module 400 continuously receives five audio signals 405-425 of five participants during an audio conference, and continuously stores these signals in the storage buffer 435. In some embodiments, each received audio signal includes audio data and metadata. For instance, the audio signal in some embodiments is a stream of audio data packets (e.g., Real-time Transport Protocol audio packets) each of which includes metadata in addition to audio data. One such packet will be further described below by FIG. 16. The metadata in some embodiments carries various information from the participants' computing devices for the focus point module to use. For example, the metadata includes participant input(s) specifying the preferences of the participants not related to the characteristics of the audio data (e.g., loudness, sampling rate, etc.). One example of such participant input(s) is muting instructions. When a first participant does not wish to receive audio of a second participant, the first participant may specify (e.g., via user interface interaction with his computing device) to have the second participant's audio muted. In some embodiments, the first participant's computing device sends metadata along with the audio data packets that identifies that the first participant wishes to mute the second participant's audio.

The metadata in some embodiments also carries some of the characteristics of the audio signal. For instance, in some embodiments, the metadata in an audio signal packet from a particular participant includes loudness information (e.g., sound pressure level measured in decibels) that indicates the average volume level of the audio content in the audio signal packet (e.g., the average volume level for the particular participant's speech content in the audio packet).

By receiving the characteristics of the audio signal as a form of metadata, the focus point module itself does not have to extract the characteristics from the audio data in some embodiments. That is, the focus point module does not have to process the audio data for the purpose of extracting the characteristics of the audio data. One of ordinary skill in the art will realize, however, that other embodiments might require the focus point module to extract some or all of such characteristics from the received audio data.

From the buffer 435, the other modules of the focus point module 400 can retrieve the signals. One such module is the signal assessment module 430, which analyzes the metadata associated with the received audio signals to identify the subset of the received audio signals for processing. Reducing the number of received signals to process saves the computational resources of the focus device and thereby improves its audio processing performance.

In some embodiments, the signal assessment module 430 prioritizes the received signals based on a set of criteria, and from this prioritized list identifies the subset of received audio signals for processing. The signal assessment module uses different sets of criteria in different embodiments. One criterion used in some embodiments is the average loudness of a received audio signal during a particular duration of time (e.g., during a few second interval, such as a 1-10 second interval).

In some embodiments, the signal assessment module 430 also considers the user inputs (e.g., muting instructions) when prioritizing the audio signals. In some cases, considering such user inputs prevents some audio signals that would have been otherwise identified as signals to be processed from being identified as the signals to be processed. For example, when a particular participant who is speaking loudest among the participants is muted by the rest of the participants, the audio signal of the particular participant should not be processed because the audio of the particular participant is not to be included in the composite signals to be sent to the rest of the participants. In such example, even though the particular participant is speaking loudest, the signal assessment module 430 does not identify the audio signal of the particular participant as a signal to be processed. In addition or in conjunction with using user inputs to limit the number of audio signals to process, the signal assessment module of some embodiments uses these inputs to configure the audio processing pipelines in other manners, as further described below.

In identifying the subset of received audio signals for processing, the signal assessment module uses the device assessor 426 to determine the number of audio signals that the focus point module 400 should process at any given time. Specifically, the device assessor in some embodiments determines how many of the received audio signals that the audio processing module 400 is to process. The number of the signals to be processed by an audio processing module of a focus device in some embodiments is determined based on the processing capacity of the focus device as described above by reference to FIG. 2. The device assessor notifies of the determined number, N, to the signal assessment module 430. The device assessor 426 performs this operation (1) once for the focus point module in some embodiments, (2) once per audio conference in other embodiments, and (3) repeatedly during an audio conference in still other embodiments.

The audio processing configurator 440 configures the audio processing pipelines 445-455 to generate composite signals from the reduced subset of received audio signals. The audio processing configurator 440 first identifies a composite audio signal for each of the participants and then configures the focus point module 400 accordingly. The audio processing configurator 440 in some embodiments identifies a composite signal for each participant to receive, based on the user inputs and signal characteristics assessments it receives from the signal assessment module 430. For instance, some embodiments exclude a particular participant's own audio from the composite signal that the particular participant is to receive. The configurator 440 in some embodiments also accounts for whether a participant is speaking at any given time and whether the participant is muted with respect to another participant, etc. Various combinations of these factors lead to two or more participants receiving the same composite audio signal in some cases.

After identifying an initial set of composite audio streams to generate, or a modification to one or more composite audio streams that are being generated, the audio processing configurator 440 starts or modifies one or more audio processing pipelines to generate or modify one or more composite audio streams. An audio processing pipeline is a series of processing operations (e.g., decoding, mixing, encoding, etc.) in some embodiments. These operations are often concatenated into a sequence of operations. For example, after decoding a received audio signal, the decoded audio signal might be mixed with one or more other decoded audio signals. Generally, the focus point module 400 uses as many audio processing pipelines as the number of composite signals it generates.

The configurator 440 configures the number of audio processing pipelines the module 400 uses, and calls one or more modules that perform the pipeline operations to generate the identified composite audio signals in some embodiments. In calling these modules, the configurator 440 in some embodiments relays to these modules identifiers that identify the audio signals to composite. Examples of these identifiers include the name of the audio signals or the location of these signals in the storage 435. The called modules then use these identifiers to retrieve the audio signals for compositing from the storage 435. In other embodiments, the configurator 440 repeatedly retrieves portions of the audio signals to composite from the storage 435 and relays these portions to the modules that it calls for performing compositing operations.

As mentioned above, the configurator considers various factors that, at times, lead to two or more participants receiving the same composite audio signal. In such instances, the number of audio processing pipelines that the audio processing uses is reduced. By reducing the number of audio processing pipelines to be used, the focus point module 400 saves additional computational resources that would have been spent otherwise unnecessarily to produce duplicative audio streams.

The operation of the focus point module 400 in the example illustrated in FIG. 4 will now be described. At the start of the audio conference, the device assessor 426 of some embodiments assesses the focus device and determines that the focus point module 400 should process only three received signals in this example. During the audio conference, the signal assessment module 430 receives audio signals from the computing devices of the participants A-E. The storage buffer 435 stores the received signals until they are retrieved. The signal assessment module 430 assesses the loudness of each received signal and prioritizes the received signals in the order of loudness. In this example, the audio signals 405, 415, 425 of the participants A, C, and E are louder (i.e., the participants A, C, and E are speaking louder) than the other two audio signals and these three signals are identified to be the signals to be processed. The signal assessment module 430 also assesses muting instructions (not shown) from the participants.

Next, the audio processing configurator 440 receives the identification and assessments from the signal assessment module 430 and identifies three composite audio streams 465-475 that the focus point module needs to generate for the five participants in this example. In this example, the audio configurator determines that the participants A and B need to receive the composite signal 465 containing the audio of the participants C and E, because participant B has muted the participant A and the participant A does not get its own signal. The audio processing configurator 440 also determines that the participants C and D need to receive the composite signal 470 containing the audio of the participants A and E, because participant D has muted the participant C and the participant C does not get its own signal. For the participant E, the audio processing configurator 440 determines that the composite signal 470 contains the audio of the participants A, C, and E, because participant D has not muted any participant. After identifying the audio streams to generate, the audio configurator 440 configures the focus point module 400 such that only three audio processing pipelines 445-455 are used to generate the three identified composite audio signals 465-475. The audio processing pipelines of the focus point module 400 retrieve some or all of the three audio signals identified to be processed from the storage buffer 435 and generates composite audio signals 465-475. The composite signals 465, 470, and 475 are sent to the participants A-E, respectively.

In the example illustrated in FIG. 4, the focus point module 400 realizes the efficiency by reducing the number of pipelines it uses because the user inputs allowed it to generate only three composite audio streams. However, in some cases when the user inputs are different, the focus point module 400 may have to generate more or less audio streams.

Figure 5:
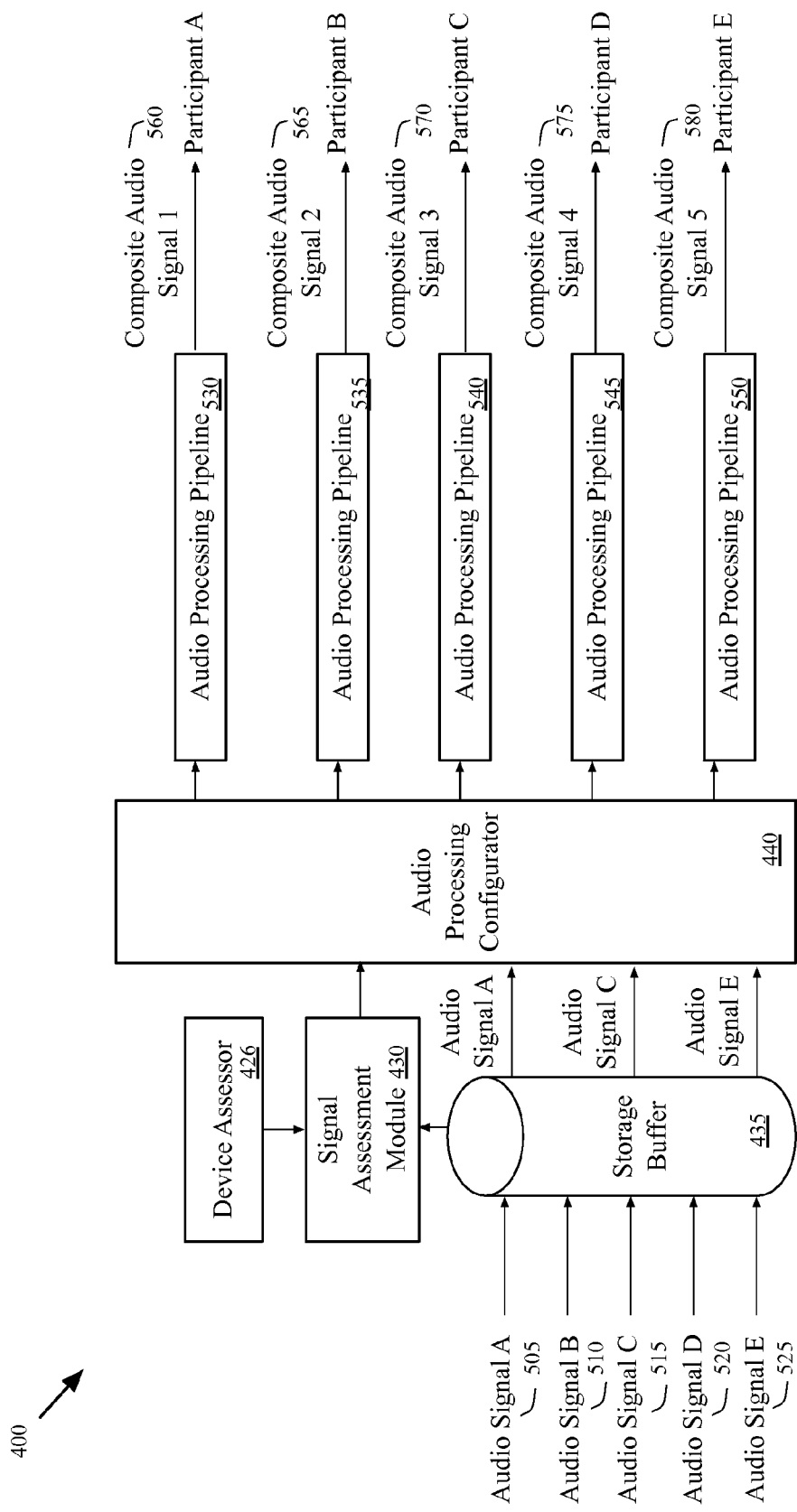
FIG. 5 illustrates a focus point module of some embodiments.

FIG. 5 illustrates an example which shows that the focus point module 400 generates five different composite audio streams, because user inputs in this example do not create a combination of the factors that allows the audio processing configurator 440 to configure the focus point module 400 to use one pipeline to generate a composite stream for two or more participants. In this example, the focus module 400 can only process audio streams from three participants, which are participants A, C and E. Also, in this example, participant E has muted participant C.

Accordingly, the configurator 440 determines that (1) participant A needs to receive the composite signal 560 containing the audio of the participants C and E because the participant A does not get its own signal, (2) participant B needs to get the composite signal 565 containing the audio of participants A, C, and E because participant B has not muted any of the participants, (3) participant C needs to receive the composite signal 570 containing the audio of participants A and E because participant C does not get its own signal, (4) participant D needs to get the composite signal 575 containing the audio of the participant A only because the participant D has muted participants C and E, and (5) participant E needs to receive the composite signal 580 containing the audio of the participants A and C because participant E does not get its own signal. After identifying the audio streams to generate, the audio configurator 440 configures the focus point module 400 such that five audio processing pipelines 530-550 are used to generate the five identified composite audio signals 560-580.

Having described several examples that illustrate a focus point module utilizing different ways of saving computational resources of a focus device, Section II will now describe the architecture of a focus point module of some embodiments.

II. FOCUS POINT MODULE

In some embodiments, the audio processing in the computing devices in the focus point network is performed by audio processing applications that execute on each computing device. Each audio processing application in some embodiments includes two modules, a focus point module and a non-focus point module, that enable each application to allow its corresponding computing device to perform both focus and non-focus point operations.

During a multi-participant conference, the audio processing application uses the focus point module when the application serves as the focus point of the conference, and uses the non-focus point module when not serving as the focus point. The focus point module performs focus point audio-processing operations when the audio processing application is the focus point of a multi-participant audio conference. On the other hand, the non-focus point module performs non-focus point audio-processing operations when the application is not the focus point of the conference.

A. Architecture

Figure 6:
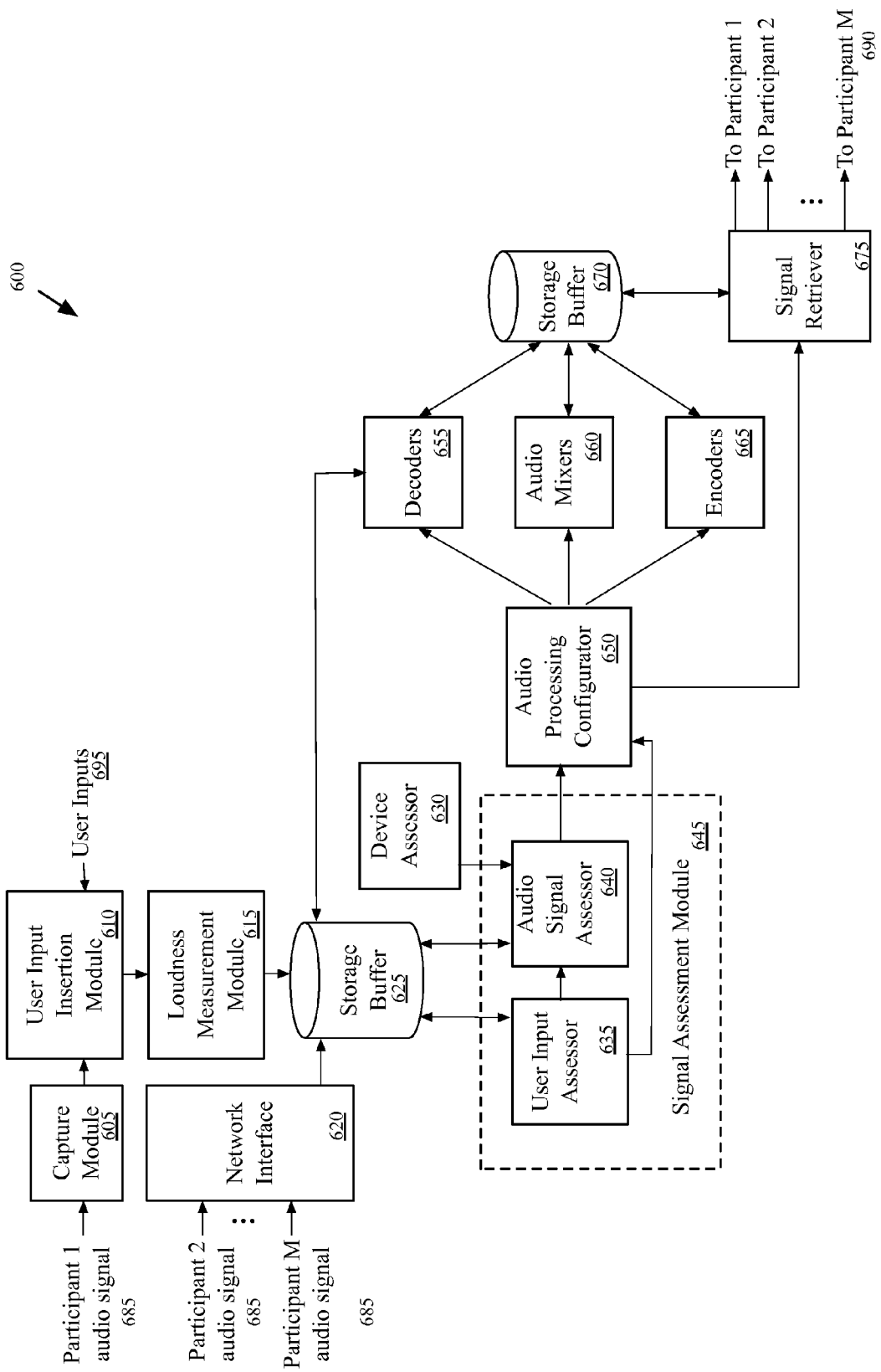
FIG. 6 illustrates a focus point module of some embodiments.

FIG. 6 illustrates an example architecture of a focus point module 600 in some embodiments. Specifically, FIG. 6 illustrates individual modules within the focus point module 600 and how these modules interact with each other. In order to improve the focus point module's audio processing performance, these modules use a subset of audio signals 685 received from participants in an audio conference in generating composite signals 690 to distribute to the participants. The focus point module 600 executes on a focus device (not shown) which is part of a focus point network (not shown) connecting the computing devices (not shown) of the participants 1 through M in the audio conference. The number M is the total number of the participants in the audio conference.

As shown, the focus point module 600 includes capture module 605, user input insertion module 610, loudness measurement module 615, network interface 620, storage buffer 625, device assessor 630, signal assessment module 645, audio processing configurator 650, decoders 655, audio mixers 660, encoders 665, storage buffer 670, and signal retriever 675.

The capture module 605 locally captures audio of the participant 1 who is using the focus device to participate in the conference. The capture module 605 continuously converts the audio from the participant 1 into an audio signal and sends the audio signal to the user input insertion module 610.

The user input insertion module receives the converted audio signal of the participant 1 and appends user inputs (e.g., muting instructions) to the audio signal. The audio signal in some embodiments is a stream of audio data packets as mentioned above. The user input insertion module 610 receives the user inputs 695 from the participant 1 and appends them to the audio data packets as a form of metadata in some embodiments.

The loudness measurement module 615 measures loudness of the audio of the participant 1. The module 615 in some embodiments examines the audio samples in each audio data packet and measures the average volume level for the packet. For instance, the measurement module 615 takes the amplitude (e.g., in decibels) of each sample and averages the amplitudes (e.g., by taking a mean or a median amplitude) over a duration of time that the samples in the packet represent (e.g., 20 milliseconds). The loudness measurement module 615 appends the measured loudness in a form of metadata to the audio data packets in some embodiments. The measurement module 615 then sends the audio signal of the participant 1 with the metadata to the storage buffer 625.

The network interface 620 continuously receives the audio signals 685 from non-focus devices of the participants 2 through M in the audio conference via the network connections that connect the focus device and the non-focus devices. As described above, each received audio signal in some embodiments is a stream of audio data packets (e.g. Real-time Transport Protocol audio packets) each of which includes metadata in addition to audio data. The network interface 620 sends the received audio signals to the storage buffer 625.

The storage buffer 625 receives the audio signals of the participants in the audio conference from the network interface 620 and the loudness measurement module 615. The signals from the network interface 620 are encoded audio signals from the participants using the non-focus devices. The signal from the loudness measurement module 615 is from the participant 1 using the focus device. The signal from participant 1 is unencoded but otherwise in an identical format as that of the audio signals from non-focus devices. The buffer 625 stores the signals until they are retrieved by other modules of the focus point module 600.

The device assessor 630 is similar to the device assessor 426 described above by reference to FIG. 4 in that the device assessor 630 determines the number N of the received audio signals that the focus point module 600 at any given time is to process in generating composite audio signals to send to the participants in the audio conference. The device assessor in some embodiments determines the number of the received audio signals to be processed by the focus point module 600 based on the processing capacity of the focus device that the assessor 600 detects, as described above. The device assessor notifies of the determined number N to the audio signal assessor 640 of the signal assessment module 645. As described above, the device assessor 630 performs this operation (1) once for the focus point module 600 in some embodiments, (2) once per audio conference in other embodiments, and (3) repeatedly during an audio conference in still other embodiments.

The signal assessment module 645 is similar to the signal assessment module 430 in that the signal assessment module 645 identifies the N signals to process among the M audio signals received from the participants in the audio conference. To identify the N audio signals, the signal assessment module 645 uses the user input assessor 635 to assess the user inputs that come along with the received audio signals and uses the audio signal assessor 640 to assess the characteristics of the audio signals. The signal assessor 640 in some embodiments identifies the N signals based on the assessment on the user inputs and the characteristics of the audio signals.

The user input assessor 635 in some embodiments retrieves the received audio signals from the buffer 625 and assesses the user inputs that come as a form of metadata associated with each received audio signal. For instance, the user input assessor 635 assesses the user inputs from a particular participant containing muting instructions and retrieves a list of participants that the particular participant wishes to mute. The user input assessor 635 notifies of the assessment of the user inputs for each received signal to the audio signal assessor 640 and the audio processing configurator 650.

In some embodiments, the audio signal assessor 640 prioritizes the audio signals based on a set of criteria, and from this prioritized list identifies the N signals for processing. As described above, different embodiments use different sets of criteria. Some embodiments use as criteria the characteristics of the audio signals, e.g., the volume level of the audio data from each participant, and the duration that the audio data's volume level exceeds a particular threshold. The audio signal assessor 640 of such embodiments is further illustrated by FIG. 7 below. The audio signal assessor 640 notifies of the identification of the N signals as well as the signal characteristics assessment to the audio processing configurator 650.

The audio processing configurator 650 configures the decoders 655, the audio mixers 660, the encoders 665, the storage buffer 670, and the signal retriever 675 in order to generate composite signals 690 from the reduced subset of received audio signals (i.e., the N audio signals). That is, the configurator 650 instantiates these modules and calls them to generate the composite signals. The audio processing configurator 650 first identifies a composite audio signal for each of the participants in the conference and then configures these modules accordingly. The configurator 650 in some embodiments identifies a composite signal for each participant to receive, based on the user inputs and signal characteristics assessments it receives from the signal assessment module 645. For instance, some embodiments exclude a particular participant's own audio from the composite signal that the particular participant is to receive. The configurator 440 in some embodiments also accounts for whether a participant is speaking at any given time and whether the participant is muted with respect to another participant, etc. Various combinations of these factors lead to two or more participants receiving the same composite audio signal in some cases. In other cases, a received signal is identified for one or more participants without being composited with other received signals.

After identifying an initial set of composite audio streams to generate, or a modification to one or more composite audio streams that are being generated, the audio processing configurator 650 in some embodiments instantiates an appropriate number of the modules 655-675 and calls them to generate the identified composite audio signals. For instance, the audio processing configurator 650 in some embodiments instantiates and calls as many number of audio mixers as the number of audio processing pipelines (e.g. audio processing pipelines described above by reference to FIGS. 4-5) necessary to generate the identified set of composite audio streams. When modification to one or more composite audio streams are being generated is necessary (e.g., when a participant mutes or un-mutes another participant during the audio conference, etc.), the audio processing configurator 650 in some embodiments dynamically changes the number of instantiated modules. For example, the configurator 650 in some embodiments instantiates more decoders to decode audio signals from un-muted participants or de-instantiate an active decoder when the audio signal being decoded is muted.

In calling these modules, the configurator 650 relays to the modules the operational parameters for these modules. Examples of these operational parameters include the name of the received audio signals, the name of the composite audio signals, encoding and decoding algorithms to use, the location of these signals in the storage buffers 625 and 670, etc. The called modules then use these operational parameters to retrieve, generate and store the signals in the buffers 625 and 670.

According to the configuration, the decoders 655, the audio mixers 660, the encoders 665, the storage buffer 670, and the signal retriever 675 generate the identified composite signals and send them to the participants in the conference. For instance, the decoders 655 retrieve the N audio signals from the storage buffer 625, decode them using one or more decoding algorithms for the N signals if it is necessary to decode, and store them in the storage buffer 670. The audio mixers 660 retrieve some or all of the decoded or unencoded audio signals from the storage buffer 670, composite them, and store the composite signals in the storage buffer 670. The encoders 665 retrieve the composite signals from the storage buffer 670 and encode them using one ore more deciding algorithms appropriate for the encoders used by the non-focus devices. The signal retriever 675 retrieves the composite signals and sends them to the participants for which the composite signals are identified.

As mentioned above, the configurator 650 considers various factors that, at times, lead to two or more participants receiving the same composite audio signal. In such instances, the number of the modules 655-675 that the focus point module 600 uses is reduced. By reducing the number of modules to be used, the focus point module 600 saves additional computational resources that would have been spent otherwise unnecessarily to produce duplicate audio streams.

The operation of the focus point module 600 in the example illustrated in FIG. 6 will now be described. During the audio conference, the capture module 605 captures the audio of the participant 1 who is using the focus device to participate in the audio conference and converts the audio into an audio signal. The user input insertion module receives the user inputs from the participant 1 and appends the inputs to the audio signal as a form of metadata. The loudness measurement module 615 measures the loudness and also appends the loudness as a form of metadata to the audio signal. The module 615 then stores the signal in the storage buffer 625. The network interface receives audio signals 685 from the non-focus devices of the participants 2 through M and stores the signals in the storage buffer 625.

The user input assessor retrieves the M audio signals of the participants 1 through M and assesses the user inputs attached to the audio signals. The user input assessor 635 sends its assessment to the audio signal assessor 640 and to the audio processing configurator 650. The device assessor determines the number N, which is a number smaller than M in this example, and notifies of the number to the audio signal assessor 640. The audio signal assessor 640 retrieves the M audio signals of the participants 1-M and assess the characteristics of the audio signals. Based on its assessment and the assessment received from the user input assessor 635, the audio signal assessor 640 prioritizes the M audio signals and identifies the N priority audio signals as the signals to be processed.

Next, the audio processing configurator 650 receives from the signal assessment module 645 the assessments and the identification of the N signals and identifies a composite audio signal for each of the participants 1-M to receive. The audio processing configurator 650 then configures the decoders 655, the audio mixers 660, the encoders 665, the storage buffer 670, and the signal retriever 675 such that the modules 655-675 generate the identified composite signals from the N received signals. The configurator 650 instantiates and calls an appropriate number of the modules for each identified composite signal. The modules 655-675 perform audio processing operations (e.g., decoding, mixing, encoding, etc.) according to the configuration and send a composite signal to each of the participants. Some specific audio processing scenarios are described further below by reference to FIGS. 8-11.

Figure 7:
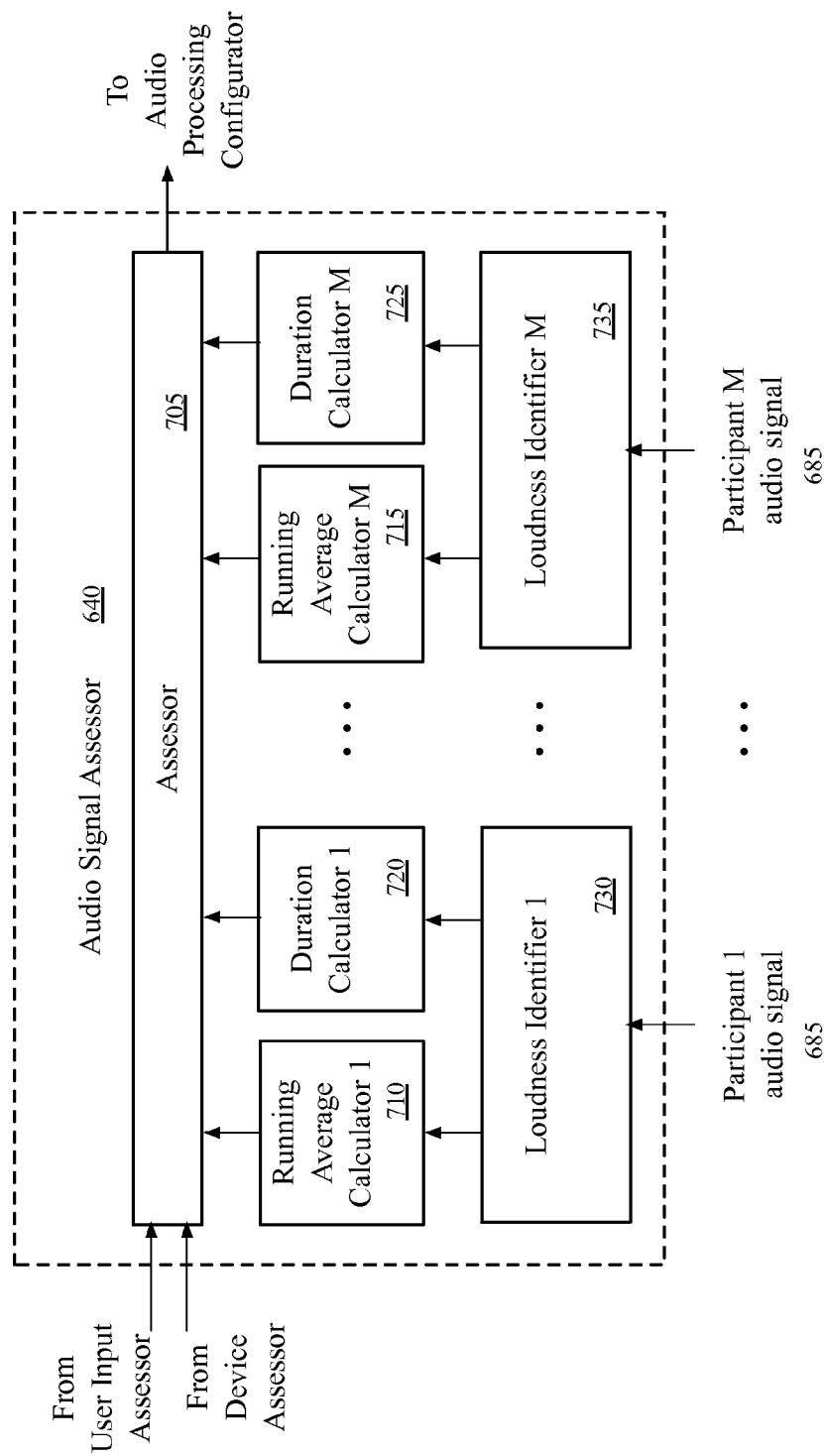
FIG. 7 illustrates an audio signal assessor of some embodiments.

FIG. 7 illustrates an example of the audio signal assessor 640 of some embodiments described above by reference to FIG. 6. The audio signal assessor 640 of these embodiments prioritizes the received audio signals 685 based on (1) the volume level of the audio data in the audio signal from each participant, and (2) the duration that the audio data's volume level exceeds a particular threshold, in order to identify the N audio signals to be used in generating composite audio signals. As shown, the audio signal assessor 640 includes assessor 705, running average calculators 710-715, duration calculators 720-725, and loudness identifiers 730-735.

Each loudness identifier identifies the loudness of the audio of one of the participants 1-M from the audio signal of the participant that the identifier retrieves from the buffer 625. As mentioned above, the audio signal in some embodiments is a stream of audio data packets, each of which includes metadata in addition to audio data. In some embodiments, the loudness identifier identifies the loudness from the metadata carrying the loudness information (e.g., sound pressure level in decibels) that indicates the average volume level of the audio content in the audio signal packet (e.g., the average volume level for the particular participant's speech content in the audio packet). The loudness identifier of other embodiments identifies the loudness by directly analyzing the audio data in the packet. For instance, the loudness identifier in some embodiments at least partially decodes the audio data to retrieve the audio samples, and measures the loudness by averaging the amplitudes (e.g., by taking a mean or a median amplitude) over a duration of time that the samples in the packet represent (e.g., 20 milliseconds). The loudness identifier passes the identified loudness to its corresponding running average calculator and duration calculator.

Each running average calculator calculates the running average loudness of the corresponding received audio signal. The running average loudness in some embodiments is calculated at any given instance in time during the audio conference and is an average loudness over a particular duration of time (e.g., a few second interval, such as a 1-10 second interval) up to the instance at which the running average is calculated. The running average calculator in some embodiments keeps track of the identified loudness (e.g., by storing in a storage buffer the identified loudness received from its corresponding loudness identifier over the particular duration of time) to calculate the running average loudness of the corresponding audio signal. The running average calculator sends the calculated running average to the assessor 705.

Each duration calculator calculates at any given instance in time during the audio conference the duration of time for which the corresponding audio signal's volume level exceeds a particular threshold (e.g., 5 decibels). That is, the duration calculator calculates how long the participant's speech has been over the threshold loudness until the instance at which the calculation is performed. In some embodiments, the duration of time spans from an instance in time the participant starts speaking (i.e., an instance that the participant's speech goes over the threshold loudness) to another instance of time at which the calculation is performed.

The duration calculator in some embodiments also determines whether the participant is speaking The duration calculator determines that the participant is not speaking when the audio signal's loudness has been under the particular threshold over a particular duration of time (e.g., a few second interval, such as a 1-10 second interval) in some embodiments. Conversely, the participant is determined to be speaking when the loudness stays over the threshold level for the particular duration of time in these embodiments.

The duration calculator of different embodiments determines differently whether the participant is speaking For example, in conjunction or instead of using the loudness and the particular threshold, the duration calculator of some embodiments determines whether the participant is speaking by checking the size of the data packets. When the participant is not speaking, the computing device of the participant in some embodiments will send a stream of small audio data packets to the focus point module. On the other hand, the computing device of a speaking participant will send a stream of larger audio data packets to the focus point module in some embodiments. The duration calculator of these embodiments calculates the size of the audio packets or uses its corresponding loudness identifier to calculate the size of the audio packets. The duration calculator keeps track of the size information and determines that the participant is not speaking when the sizes of the packets are smaller than a threshold size for a particular duration of time (e.g., a few second interval, such as a 1-10 interval). Conversely, the participant is determined to be speaking when the sizes of the packets are larger than the threshold size for the particular duration of time.

The duration calculator then sends to the assessor 705 the calculated duration and an indicator indicating whether the participant is speaking In some embodiments, a calculated duration (e.g., a minus duration) itself may serve as the indicator indicating that the participant is not speaking The assessor 705 of some embodiments uses the device assessor to determine the number N and identifies the N audio signals to process based on the calculated running average loudness and the duration of the participant's speech for each received audio signal. The assessor 705 prioritizes the signals in the order of loudness in some embodiments. Hence, the audio signals from the N participants who have been speaking loudest on the average are identified as the signals to be processed in this example. In some cases, two or more audio signals have the same running averages of loudness at the instance the running averages are calculated. In such cases, the assessor 705 in some embodiments prioritizes those signals in the order of longer durations of speech. That is, when some participants have been speaking at the same average loudness level at any given instance in time, the audio signals of the participant who has been speaking for the longest time period until that instance would be prioritized higher than the signals of the other participants.

In some embodiments, the assessor 705 also considers the user inputs (e.g., muting instructions) received from the user input assessor. As described above, considering such user inputs in some cases prevents some audio signals that would have been otherwise identified as signals to be processed from being identified as the signals to be processed.

In operation, each of the loudness identifiers 730-735 retrieves a received audio signal of one of participants 1 through M from the storage buffer 625. The loudness identifier in some embodiments identifies the loudness of the audio signal per each audio data packet. The loudness identifier sends the identified loudness to its corresponding running average calculator and duration calculator. Upon receiving the loudness from the corresponding loudness identifier, each of the running average calculators 710-715 calculates the running average loudness of the corresponding audio signal at that instance in time. On the other hand, each of the duration calculators 720-725 calculates the duration of the participant's speech and determines whether the participant is speaking The running average calculator and the duration calculator send the results of their calculations and determinations to the assessor 705. The assessor takes these calculations and determinations as well as inputs from the user input assessor and the device assessor and identifies N audio packets from the N participants that are loudest and not muted by the rest of the participants. Then the assessor 705 notifies of its assessment of the signals to the audio processing configurator.

The focus point module 600 was described above for some embodiments of the invention. One of ordinary skill in the art will realize that in other embodiments this module can be implemented differently. For instance, in some embodiments described above, certain modules are implemented as software modules. However, in other embodiments, some or all of the modules might be implemented by hardware. For example, while in some embodiments the decoder and encoder modules are implemented as software modules, in other embodiments one or both of these modules are implemented by hardware, which can be dedicated application specific hardware (e.g., an ASIC chip or component) or a general purpose chip (e.g., a microprocessor or FPGA).

Having described an example architecture of a focus point module in some embodiments, the subsection II.B will now describe several specific audio-processing scenarios.

B. Audio Processing Pipeline Scenarios

As described above, some embodiments save the computational resources of a focus device by reducing the number of the received audio signals for processing. Some embodiments save additional computational resources that would have been spent otherwise unnecessarily to produce duplicative audio streams in some cases. Such cases occur when various combinations of several factors that some embodiments consider lead to two or more participants receiving the same composite audio signal. Some such factors include: (1) whether to include a particular participant's own audio in the composite audio signal to be sent to the particular participant, (2) whether the particular participant has muted any of the other participants' audios, and (3) whether a participant is speaking Some embodiments do not include a particular participant's own audio signal in the composite audio signal for the particular participant. When a first participant has muted a second participant's audio, the second participant's audio is not included by some embodiments in the composite audio signal for the first participant. When a particular participant's audio signal is silent (i.e., the participant is not speaking), some embodiments do not include the particular participant's audio signal in any of the mixed audio signals. FIGS. 8-11 below illustrate several specific scenarios of operations performed by a focus point module of some embodiments that consider these factors.

Figure 8:
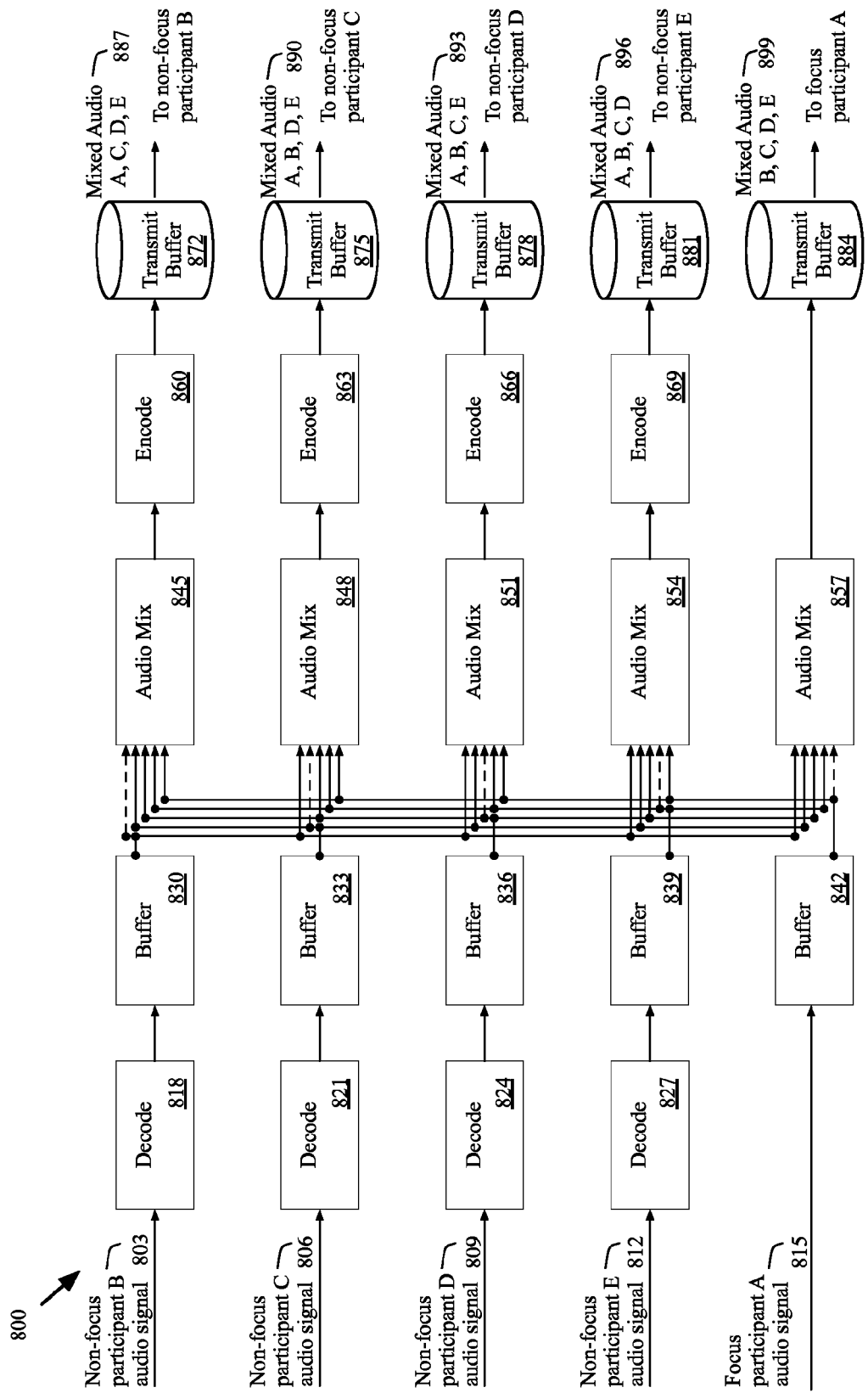
FIG. 8-11 illustrates exemplary operations of a focus point module of some embodiments.

FIG. 8 conceptually illustrates an example set of operations 800 that a focus point module performs in a scenario in which every participant in an audio conference is speaking, no participant is muted by another participant, and the audio signal of every participant is processed (i.e., no limits on the number of audio signals to process). The audio conference in this example is conducted through a focus point network connecting a focus device of participant A and non-focus devices of participants B-E. FIG. 8 illustrates that the set of operations 800 includes decoding operations 818-827, buffering operations 830-842, mixing operations 845-857, encoding operations 860-869, buffering and transmitting operations 872-884. Additional operations that may be included in the set are not depicted in this figure for simplicity. For instance, additional buffering operation can be performed by the focus point module between a pair of mixing operation and encoding operation in some embodiments.

The focus point module in some embodiments performs the set of operations 800 using the decoders 655, the audio mixers 660, the encoders 665, the storage buffer 625, and the storage buffer 670, and signal retriever 675 as configured by the audio processing configurator 650 described above by reference to FIG. 6. By performing the set of operations 800, the focus point module generates the composite signals 887-899 from the five received audio signals 803-815 and sends the composite signals 887-899 to the participants B-E and A. In this scenario, the focus point module is configured in such a way that a composite audio signal for a particular participant does not include the particular participant's own audio.

At 818-827, the focus point module decodes the audio signals 803-812 of the participants B-E who are using the non-focus devices to participant in the audio conference. Each audio signal is received as encoded and the focus point module in some embodiments decodes the signal using a decoding algorithm that is appropriate for the encoder of the non-focus device that is used to encode the signal. The algorithms are specified during the process that sets up the audio conference in some embodiments.

Next, at 830-839, the focus point module performs buffering operations to store the decoded audio signals. At 842, the buffer performs a buffing operation to store the audio signal 815 of the participant A, who is using the focus device. As described above, the audio signal captured by the focus device is received as unencoded and therefore the focus point module does not have to perform a decoding operation on such audio signal.

At 845, the focus point module retrieves the buffered audio signals 815, 806, 809, and 812 of the participants A, C, D, and E (i.e., the outputs of the buffering operations 842, 833, 836, and 839) and mixes the signals to generate the composite signal 887 to send to the participant B. The signal 803 of the participant B is not used in the mixing operation 845 because the signal 803 is the participant B's own. Similarly, at 848, the focus point module retrieves the buffered audio signals 815, 803, 809, and 812 of participants A, B, D, and E and mixes them to generate the composite signal 890 to send to the participant C. At 851, the focus point module retrieves buffered audio signals 815, 803, 806, and 812 of the participants A, B, C, and E and mixes them to generate the composite signal 893 to send to the participant D. At 854, the focus point module retrieves buffered audio signals 815, 803, 806, and 809 of the participants A, B, C, and D and mixes them to generate the composite signal 896 to send to the participant E. At 857, the focus point module retrieves buffered audio signals 803-812 of the participants B, C, D, and E and mixes them to generate the composite signal 899 to send to the participant A.

Next, at 860-869, the focus point module encodes the composite signals 887-896 (i.e., the outputs of the mixing operations 845-854) and encodes the signals. In some embodiments, the focus point module uses an encoding algorithm for each composite signal that is appropriate for the decoder of the non-focus device that the composite signal is to be sent to. The algorithms are specified during the process that sets up the audio conference in some embodiments.

At 872-878, the focus point module performs buffering and transmitting operations to store and transmit the encoded composite signals 887-896 to the non-focus devices of the participants B-E. At 884, the focus point buffers the unencoded composite signal 899 (i.e., gets the output of the mixing operation 857) and then sends the composite signal to the participant A, who is using the focus device. Because the composite signal 899 is not transmitted over the network to another computing device, the signal 899 does not have to be encoded (e.g., compressed) for the focus device's local consumption.

Figure 9:
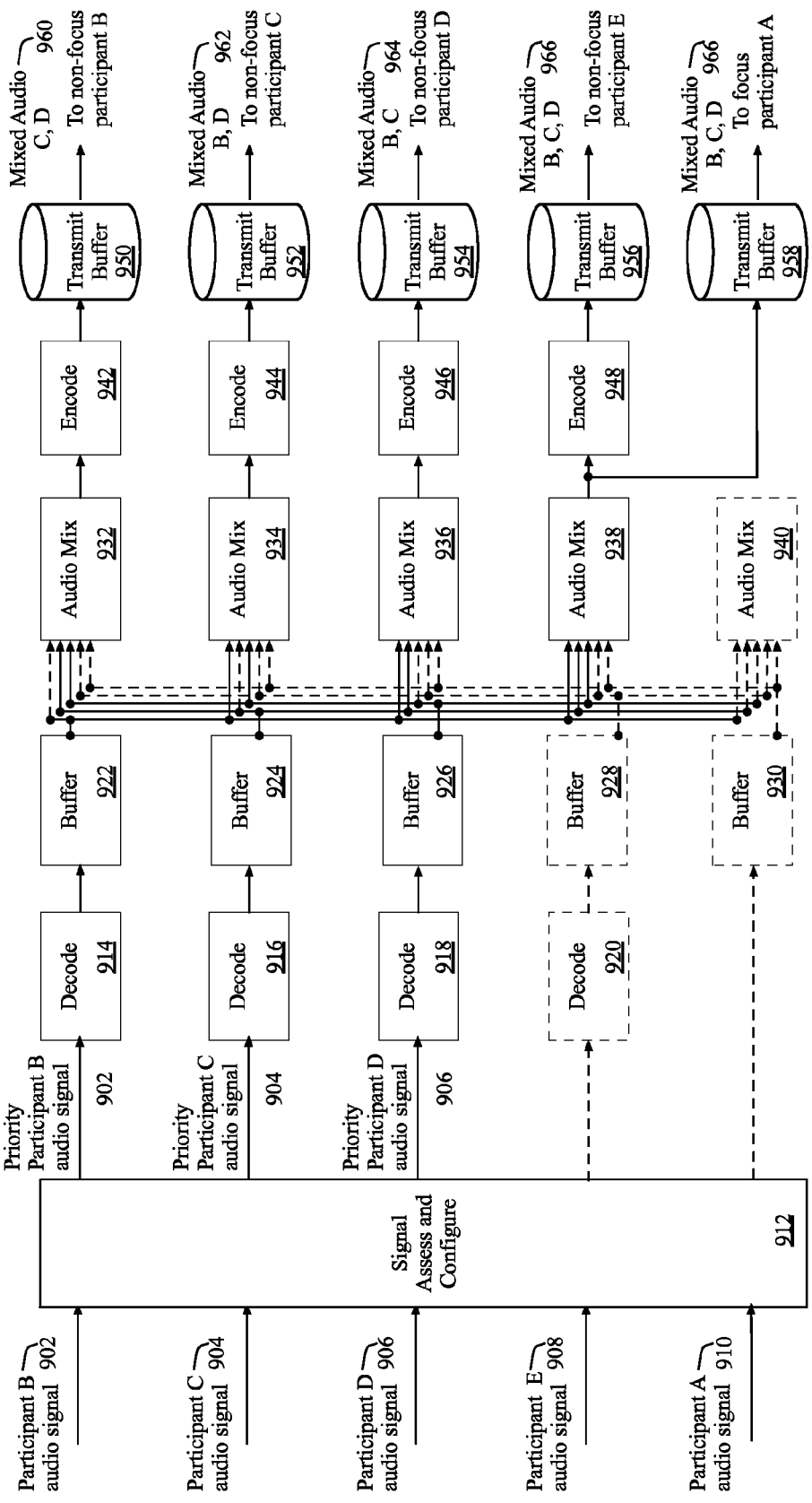

FIG. 9 conceptually illustrates an example set of operations 900 that the focus point module performs in a scenario during the same audio conference described above by reference to FIG. 8. At time T1 during the audio conference, all five participants are speaking, participants B, C, and D are speaking louder than the participants A and E are, and no participants are muted with respect to other participants. FIG. 9 illustrates that the set of operations 900 include signal assessing operation 912, decoding operations 914-920, buffering operations 922-930, mixing operations 932-940, encoding operations 942-948, buffering and transmitting operations 950-958.

The operations 920, 928, 930, and 940 depicted as dotted boxes to indicate that they do not have to be performed by the focus point module in this scenario. The focus point module performs the operations 900 to generate the composite signals 960, 962, 964, and 966 from the received audio signals 902, 904, and 906 of the participants B, C, and D and send the composite signals to the participants A-E. In this scenario, it has been determined that the focus point module can process three received audio signals only.

At 912, the focus point module performs signal assessment and audio processing configuration operation. The focus point module identifies the signals 902, 904, and 906 of the participants B-D as the priority signals (i.e., signals to process) because these three participants are speaking the loudest at the time T1. The focus point module identifies a composite audio signal for each participant to receive. For the participants A and E, the same composite signal 966 containing the audio of the participants B, C, and D is identified because the participants A and E did not mute any of the participants B, C, and D.

At 914-918, the focus point module decodes the priority signals 902, 904, and 906 of the participants B, C, and D. The decoding operation 920 is not performed because participant E's audio signal is not identified as a priority audio signal.

Next, at 922-926, the focus point module performs buffering operations to store the decoded priority signals. The buffering operation 928 is not performed because the decoding operation 920 for the signal 908 is not performed. The buffering operation 930 is not performed because the participant A's audio signal 910 is not a priority signal.

At 932, the focus point module retrieves buffered priority signals 904 and 906 of the participants C and D (i.e., the outputs of the buffering operations 924 and 926) and mixes the signals to generate the composite signal 960 to send to the participant B. The priority signal 902 is not used in the mixing operation 932 because the signal 902 is the participant B's own. Similarly, at 934, the focus point module retrieves buffered priority signals 902 and 906 of the participants B and D and mixes the signals to generate the composite signal 962 to send to the participant C. At 936, the focus point module retrieves buffered priority signals 902 and 904 of the participants B and C and mixes the signals to generate the composite signal 964 to send to the participant D. At 938, the focus point module retrieves all three buffered priority signals 902, 904, and 906 of the participants B, C, and D and mixes the signals to generate the composite signal 966 to send to the participants A and E. Because the participants A and E are to receive the same composite audio signal containing audio of the participants B, C, and D, the focus point module does not have to perform the mixing operation 940 separately to generate a separate composite signal for the participant A.

Next, at 942-946, the focus point module encodes the composite audio signals 960-964 for the participants B, C, and D. At 948, the focus point modules encodes the composite audio signal 966 for the participant E. The focus point module does not encode the same composite signal 966 for the participant A because the participant A is using the focus device and a signal sent to the focus device does not have to be encoded as described above. At 950-958, the focus point module then buffers and sends the composite signals to the destination participants.

As compared to the example described above by reference to FIG. 8, the focus point module in this example processes two less received signals and thereby reducing the amount of audio data to process. Also, the focus point module in this example performs one less decoding operation, two less buffering operations, and one less audio mixing operation. As such, the focus point module in this example saves computing resources of the focus device.

Figure 10:
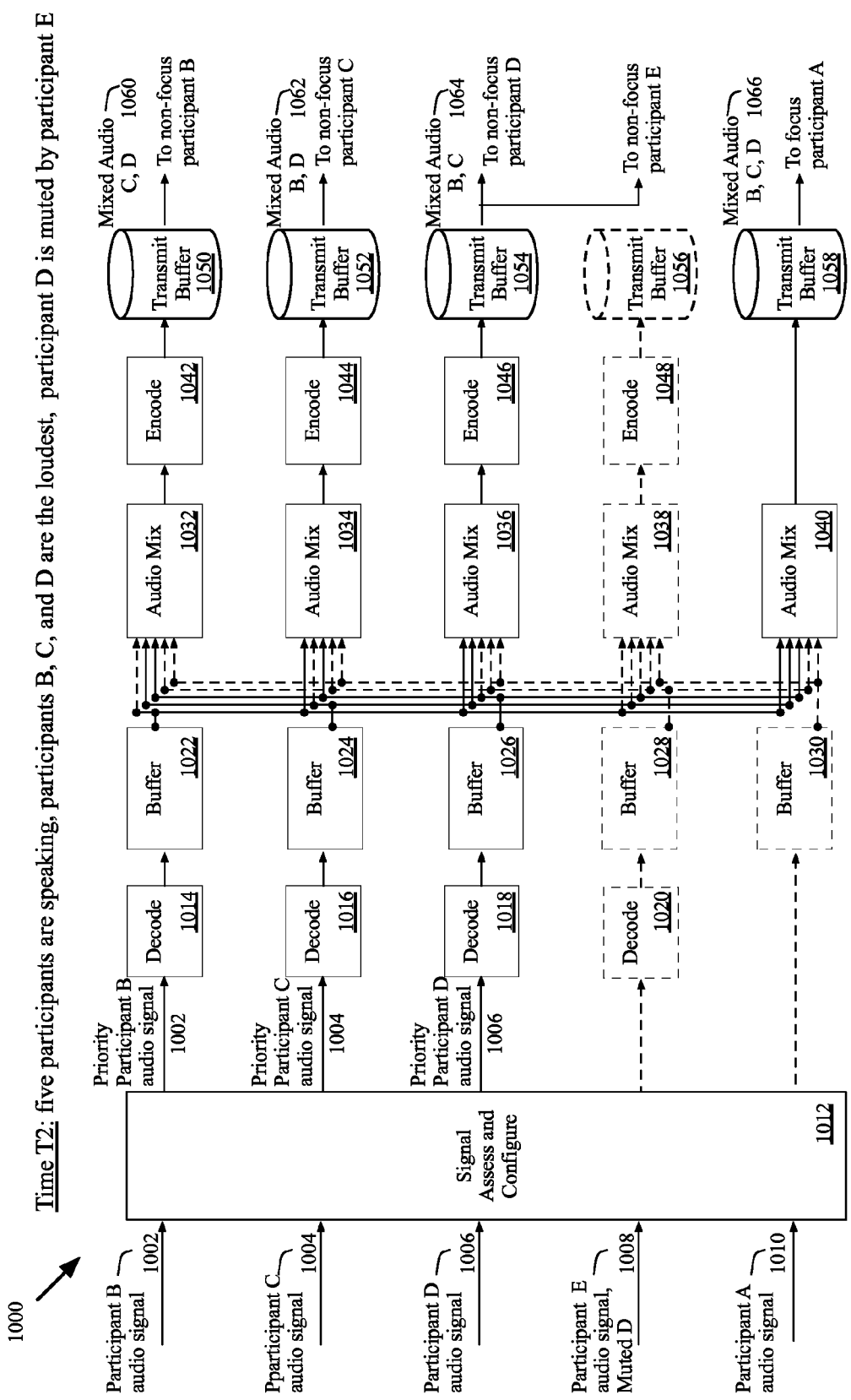

FIG. 10 illustrates an example set of operations 1000 that the focus point module performs in a scenario during the same audio conference described above by reference to FIGS. 8 and

9. At the time T2 during the audio conference, (1) all five participants are speaking, (2) participants B, C, and D are speaking louder than the participants A and E, and (3) participant E has been muted with respect to participant D. FIG. 10 illustrates that the set of operations 1000 includes signal assessing operation 1012, decoding operations 1014-1020, buffering operations 1022-1030, mixing operations 1032-1040, encoding operations 1042-1048, buffering operations 1050-1058.

The focus point module performs the operations 1000 to generate the composite signals 1060-1066 from the received audio signals 1002, 1004, and 1006 of the participants B, C, and D and send the composite signals to the participants A-E. In this scenario, it has been determined that the focus point module can process three received audio signals only.

At 1012, the focus point module performs signal assessment and audio processing configuration operation. The focus point module identifies the signals 1002, 1004, and 1006 of the participants B-D as the priority signals (i.e., signals to process) because these three participants are speaking the loudest at the time T2. The focus point module identifies a composite audio signal for each participant to receive. For the participants D and E, the same composite signal 1064 containing the audio of the participants B and C is identified because the participant D does not get its own audio and the participant E has muted the participant D.

At 1014-1018, the focus point module decodes the priority signals 1002, 1004, and 1006 of the participants B, C, and D. The decoding operation 1020 is not performed because participant E's audio signal is not identified as a priority audio signal.

Next, at 1022-1026, the focus point module performs buffering operations to store the decoded priority signals. The buffering operation 1028 is not performed because the decoding operation 1020 for the signal 1008 is not performed. The buffering operation 1030 is not performed because the participant A's audio signal 1010 is not a priority signal.

At 1032, the focus point module retrieves buffered priority signals 1004 and 1006 of the participants C and D (i.e., the outputs of the buffering operations 1024 and 1026) and mixes the signals to generate the composite signal 1060 to send to the participant B. The priority signal 1002 is not used in the mixing operation 1032 to generate the composite signal 1060 because the signal 1002 is the participant B's own. Similarly, at 1034, the focus point module retrieves buffered priority signals 1002 and 1006 of the participants B and D and mixes the signals to generate the composite signal 1062 to send to the participant C. At 1036, the focus point module retrieves buffered priority signals 1002 and 1004 of the participants B and C and mixes the signals to generate the composite signal 1064 to send to the participants D and E. Because the participants D and E are to receive the same composite audio signal containing audio of the participants B and C, the focus point module does not have to perform the mixing operation 1038 separately to generate a separate composite signal for the participant E. At 1040, the focus point module retrieves all three buffered priority signals 1002, 1004, and 1006 of the participants B, C, and D and mixes the signals to generate the composite signal 1066 to send to the participant A.

Next, at 1042 and 1044, the focus point module encodes the composite audio signals 1060 and 1062 for the participants B and C. At 1046, the focus point module in some embodiments encodes the composite audio signal 1064 for both the participants B and C using the same encoding algorithm that is appropriate for the decoders of the non-focus devices of the participants B and C. However, when the decoders of the non-focus devices of the participants B and C are different, the focus point module in some embodiments performs both of the encoding operations 1046 and 1048 using different decoding algorithms.

At 1050-1054 and 1058, the focus point module then buffers and sends the composite signals to the destination participants. The focus point module in some embodiments does not perform the buffering and transmitting operation 1056 because the focus point module does not perform the encoding operation 1048 to separately encode the composite signal 1064.

As compared to the example described by reference to FIG. 8, the focus point module in this example performs one less decoding operation, three less buffering operations (operations 1028, 1030, and 1056), one less audio mixing operation, and one less encoding operation. As such, the focus point module in this example saves computing resources of the focus device.

Figure 11:
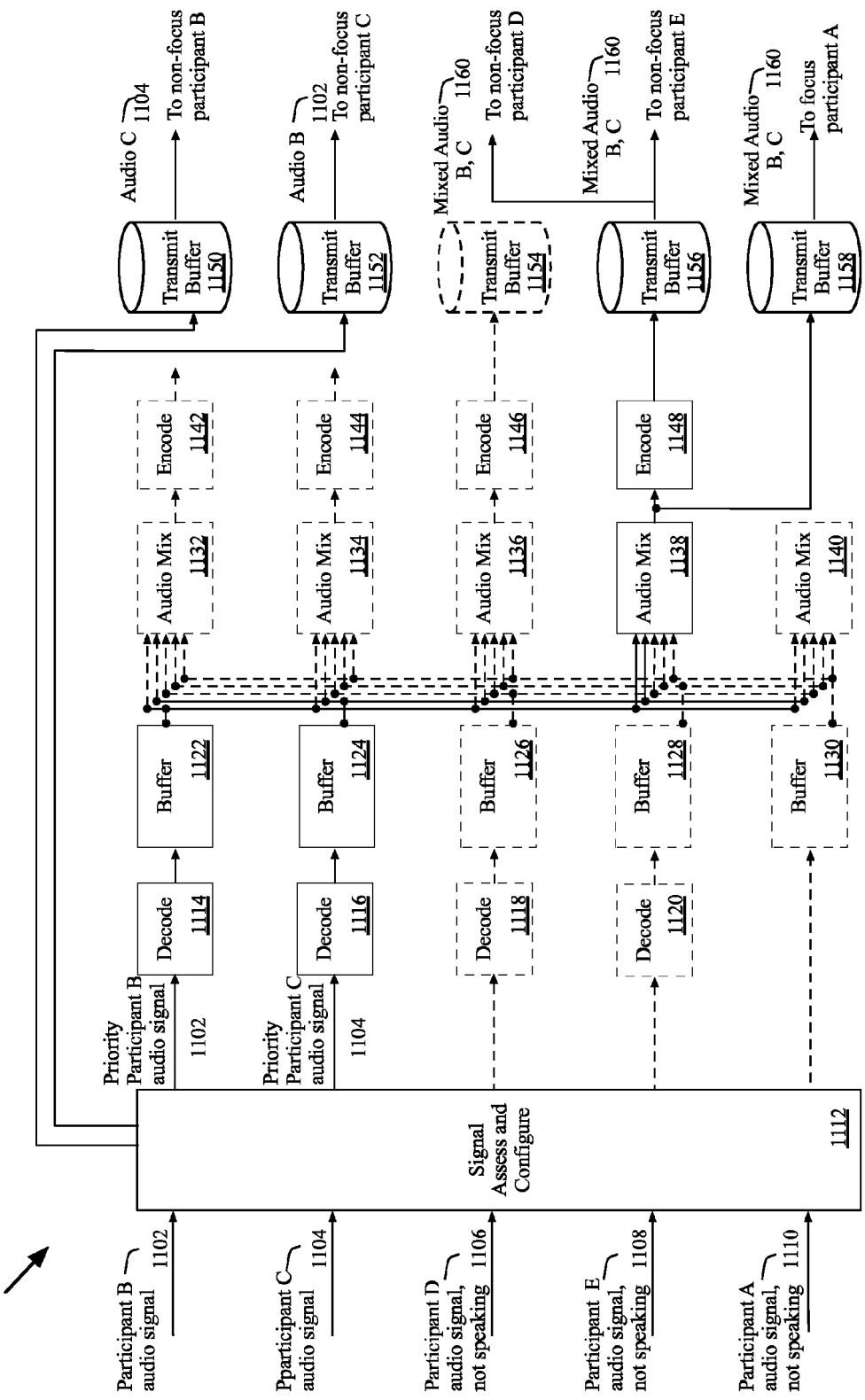

FIG. 11 illustrates an example set of operations 1100 that the focus point module performs in a scenario during the same audio conference described above by reference to FIG. 8-10. At time T3 during the audio conference, only two (participants B and C) of the five participants are speaking and no participant is muted with respect to other participants. FIG. 11 illustrates the set of operations 1100 includes signal assessing operation 1112, decoding operations 1114-1120, buffering operations 1122-1130, mixing operations 1132-1140, encoding operations 1142-1148, buffering operations 1150-1158.

The focus point module performs the operations 1100 to generate the composite signal 1160 from the received audio signals 1102 and 1104 of the participants B and C and send the received signals 1102 and 1104 to the participants C and B, respectively, and the composite signal 1160 to the participants A, D, and E. In this scenario, it has been determined that the focus point module can process three received audio signals only.

At 1112, the focus point module performs signal assessment and audio processing configuration operations. The focus point module identifies only the signals 1102 and 1104 of the participants B and D as the priority signals (i.e., signals to process) because these two participants are the only speaking participants at the time T3 even though the focus point module can process one more received audio signal. For the participant B, the focus point module identifies the audio signal 1104 of the participant C as the signal to be sent to the participant B because one of the two priority signals is the participant B's own. Similarly, for the participant C, the focus point module identifies the priority signal 1104 of the participant B as the signal to be sent to the participant C. For the participants A, D, and E, the focus point module identifies the composite signal 1160 containing the audio of the participants B and C because the two priority signals of the participants B and C are not the participants A, D, or E's own and participants B and C are not muted with respect to the participants A, D, or E.

At 1114 and 1116, the focus point module decodes the priority signals 1102 and 1104 of the participants B and C. The decoding operations 1118 and 1120 are not performed because participants D and E are not speaking and thus their audio is not to be included in any of the composite signals.

Next, at 1122 and 1124, the focus point module performs buffering operations to store the decoded priority signals. The buffering operations 1126 and 1128 are not performed because the decoding operations 1118 and 1120 are not performed. The buffering operation 1130 is not performed because the participant A is not speaking At 1138, the focus point module retrieves buffered priority signals 1102 and 1104 of the participants B and C and mixes the signals to generate the composite signal 1160 to send to the participants A, D, and E. The mixing operation 1136 and 1140 does not have to be separately performed to generate a separate composite signal for each of the participants D and E. The focus point module does not perform the mixing operations 1132 and 1134 because the participants B and C are not to receive composite audio signals.

Next, at 1148, the focus point module in some embodiments encodes the composite audio signal 1160 for both of the participants D and E using the same encoding algorithm that is appropriate for the decoders of the non-focus devices of the participant D and E. However, when the decoders of the non-focus devices of the participant D and E are different, the focus point module in some embodiments performs both of the encoding operations 1146 and 1148 using different decoding algorithms.

At 1150 and 1152, the focus point module buffers and transmits the priority signals 1104 and 1102 that are not decoded nor encoded by the focus point module to the participants B and C. The signals 1102 and 1104 are not decoded nor encoded by the focus point module in some embodiments because the non-focus devices of the participants B and C use the same pair of encoder and decoder that use the same encoding and decoding algorithms appropriate for each other. However, when the two non-focus devices use different encoders and decoders, the focus point module in some embodiments performs the encoding operations 1142 and 1144 using different encoding algorithms. At 1156, the focus point module buffers and transmits the composite signal 1160 to the participants D and E. The focus point module does not perform the buffering and transmitting operation 1154 because the focus point module does not perform the encoding operation 1146 to separately encode the composite signal 1160 for the participant D. At 1158, the focus point module buffers and sends the composite signal 1160 to the participant A.

As compared to the example described by reference to FIG. 8, the focus point module in this example performs two less decoding operations, four less buffering operations (i.e., operations 1126, 1128, 1130, and 1154), four less audio mixing operations, and three less encoding operations. As such, the focus point module in this example saves computing resources of the focus device.

Having described the architecture of the focus point audio processing module, Section III will now describe several conceptual processes that the focus point module performs.

III. PROCESSES

Figure 12:
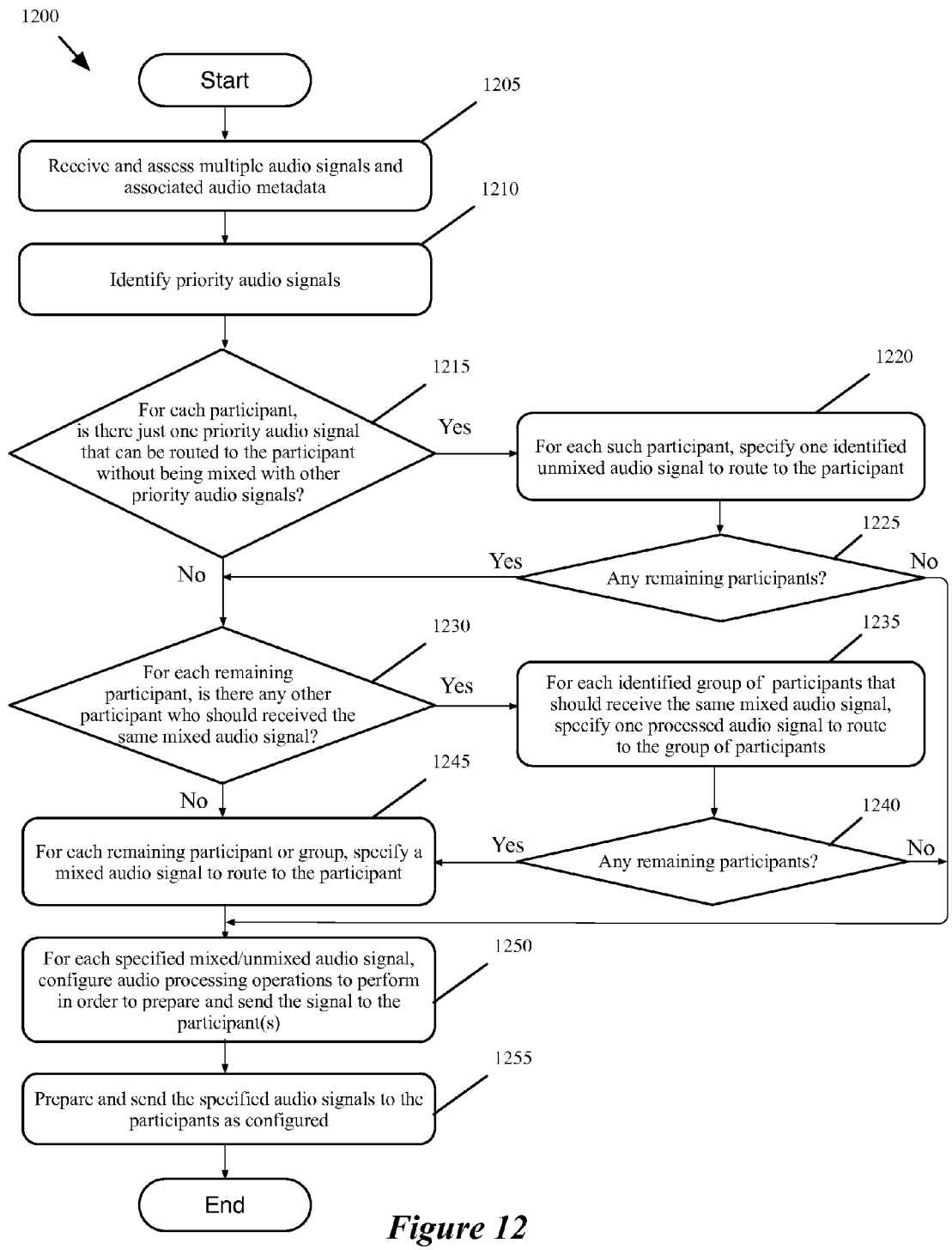
FIG. 12 illustrates conceptually illustrates an example of a process that some embodiments use to process audio signals.

FIG. 12 conceptually illustrates an example process 1200 of some embodiments performed by a focus point module (e.g., the focus point module 600 described above by reference to FIG. 6) of a focus device that is connected to non-focus devices through a focus point network. The focus point network in this example is utilized to conduct an audio conference among at least three computing devices of the participants in the conference. In some embodiments, the process 1200 starts when the audio conference starts. In some embodiments, process 1200 runs at regular intervals (e.g., 50 times per second, 10 times per second, etc.) in order to continuously provide mixed/unmixed audio signals to the participants and save the computational resources of the focus device.

As shown in FIG. 12, the process begins (at 1205) by receiving and assessing audio signals from the participants' computing devices. In some embodiments, the audio signals from non-focus participants are sent from the non-focus point modules of the non-focus devices. The process receives the focus participant's audio signal directly from the focus device in some embodiments. As described above, each audio signal is a stream of audio data packets in some embodiments.

The process also (at 1205) receives and assesses audio metadata from the participant's computing devices. As described above, audio metadata include loudness information (e.g., loudness level measured in decibel) in some embodiments. The loudness information is measured by a non-focus point module or the focus-point module depending on the origin of the received audio signals. The loudness information is appended as a form of metadata to each audio data packet in some embodiments. With this information, the focus point module in some embodiments calculates a running average of loudness for an audio signal of a participant and determines the duration of the participant's speech or the silence of the participant.

The audio metadata include muting instructions in some embodiments as described above. This metadata is generated by a first participant's computing device upon receiving the first participant's inputs. Such inputs might include, for example, the first participant's selection of participant(s) whose audio should be muted. This selection may involve clicking a mouse button or tapping a touchscreen to select a user interface (UI) item, selecting an option through keyboard input, etc. With the list from the first participant, the process 1200 specifies that an identified participant's audio signal is not to be included in the audio signal sent to the first participant.

Next, the process 1200 identifies (at 1210) priority audio signals. As described above, priority audio signals are audio signals identified to be processed (i.e., to be composited or sent to a participant without being composited). The process identifies the priority participants based on a set of criteria in some embodiments. An example criterion is a running average loudness of each received audio signal. The process identifies a subset of the received audio signals as priority audio signals and uses only the priority audio signals to generate composite audio signals to send to the participants or sends only the priority audio signals to the participants. The operations that the process performs to identify priority audio signals are described further by reference to FIG. 13 below.

The process 1200 then determines (at 1215), for each participant, whether a single priority audio signal can be routed to the participant without being mixed with other priority audio signal(s). As described above, this will be the case when a particular participant only needs to receive audio from one other participant whose audio signal is a priority audio signal. This may occur when the particular participant has muted one or more other participants and/or one or more of the other participants are not speaking For instance, the participant B in FIG. 11 receives only the audio signal of the participant C because the participant C is the only speaking participant other than the participant B at the instance and the participant B has not muted participant C.

When the process determines (at 1215) that there are one or more participants that should receive an unmixed priority audio signal, the process specifies (at 1220) the one identified priority audio signal to route to each such participant. The process then determines (at 1225) whether there are any remaining participants for whom audio signals have not yet been specified. When audio signals have been specified for all of the participants, the process proceeds to operation 1250, described below.

When there are remaining participants, the process determines (at 1230), for each remaining participant, whether there are any other participant(s) who should receive the same mixed audio signal. As described above, this will be the case when two or more of the participants should receive the audio of the same set of participants. For instance, when two participants are not speaking while some other participants speak in the conference, those two non-speaking participants will receive the same mixed audio signal (e.g., the participants A, D and E in FIG. 11). Similarly, when none of the priority signals are of the two non-speaking participants, these participants will receive the same mixed audio signal. Various other combinations of priority participants, lists of muted participants, and silent participants can lead to multiple participants receiving the same audio signal as described above.

When the process determines (at 1230) that at least two participants should receive the same mixed audio signal, the process specifies (at 1235), for each group of participants sharing a mixed audio signal, one mixed audio signal to route to the group of participants. Based on this specification, the focus point module will not separately generate a mixed audio signal for each of the participants in the group. The process then determines (at 1240) whether there are any remaining participants for whom audio signals have not yet been specified. When audio signals have been specified for all of the participants, the process proceeds to operation 1250, described below.

When the process determines (at 1240) that there is at least one remaining participant whose audio signal has not been specified, the process then specifies (at 1245) a unique mixed audio signal to route to each of the remaining participants. At this point, all of the signals for participants will have been specified.

The process 1200 then configures (at 1250) audio processing operations (e.g., decoding, mixing, encoding, buffering operations, etc.) to perform in order to prepare and send each specified audio signal to the designated participant(s). The process 1200 in some embodiments determines an appropriate number of such operations to perform, the appropriate algorithm(s) for decoding the priority signals, and the appropriate encoding algorithm(s) to encode the specified audio signal, etc. For instance, for the mixed signal 966 described above by reference to FIG. 9, the process would determine that three decoding operations to perform to decode the three priority signals 902, 904, and 906, one mixing operation to perform to mix the three priority signals for the participants A and E, one encoding operation to perform to encode the composite signal for the participant E only, etc.

Next, the process 1200 (at 1255) prepares and sends each specified unmixed/mixed audio signal by performing the audio processing operations as configured. The process 1200 stops preparing and sending the specified audio signals and ends, once the audio conference ends.

Figure 13:
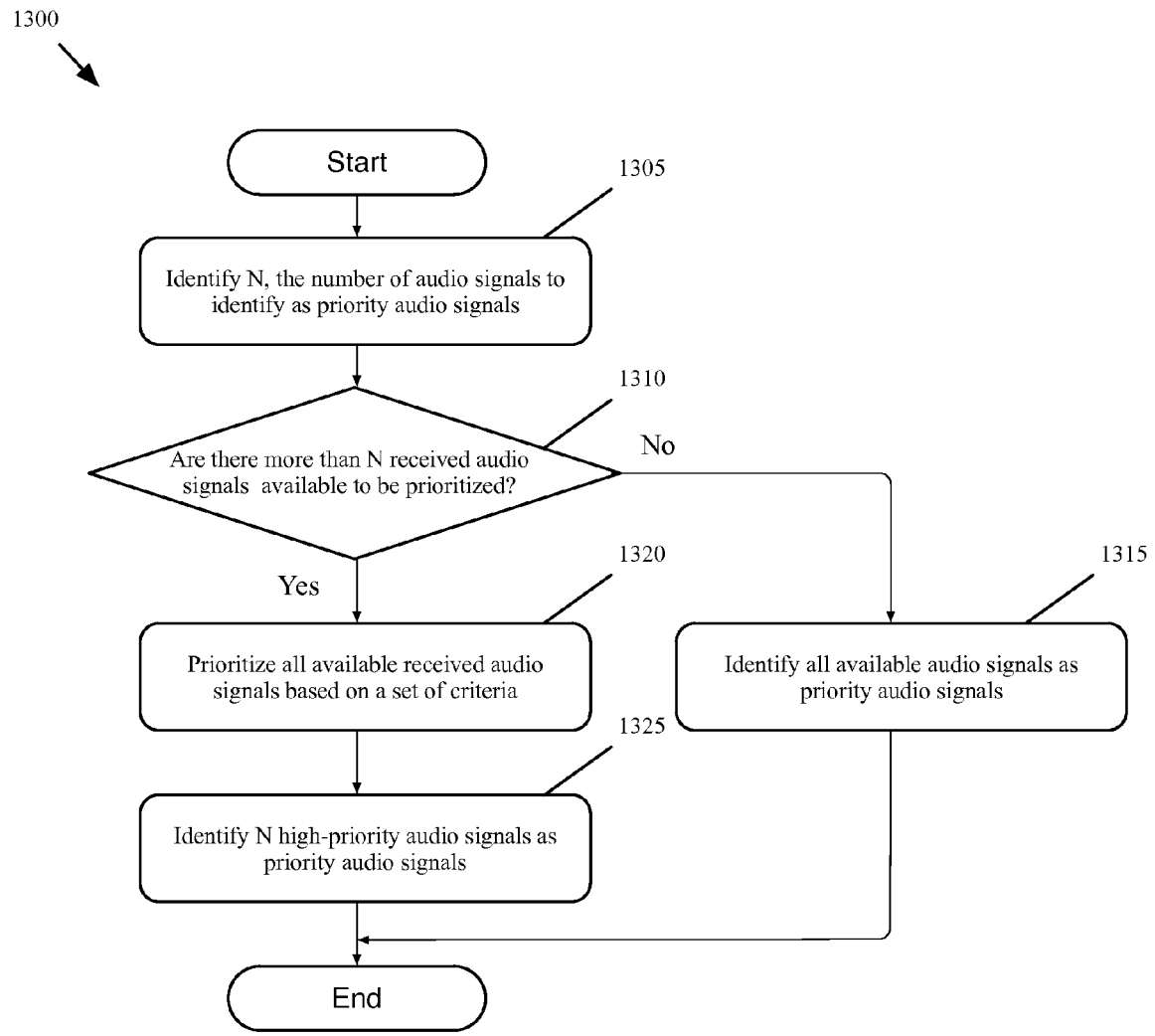
FIG. 13 illustrates conceptually illustrates an example of a process that some embodiments use to prioritize audio signals.

FIG. 13 conceptually illustrates a process 1300 of some embodiments performed by a focus point module to identify priority audio signals of the participants in an audio conference conducted through a focus point network. Specifically, the process 1300 expands the operation 1210 that the process 1200, described above by reference to FIG. 12, performs. In some embodiments, the process 1300 starts when audio signals and metadata from the participants of the audio conference are received and assessed.

As shown in FIG. 13, the process 1300 begins (at 1305) by identifying a number N, which is the number of received audio signals to identify as priority audio signals. As mentioned above, priority audio signals are the only audio signals to be used to generate mixed audio signals or to be sent to the participants without being mixed. In some embodiments, the process determines the number N based on the processing capacity of the focus device. The number N in some embodiments is the number of received audio signals the focus device can handle while leaving certain amount of computing resources (e.g., an 80% of the central processing unit cycles) to other performance-sensitive applications (e.g., a multiplayer game application) that may execute on the focus device.

Next, the process 1300 determines (at 1310) whether there are more than N received audio signals available to be prioritized. As described above, the audio signal of a non-speaking participant or the participant who is muted with respect to the rest of the participants are not to be included in any mixed signals or to be sent to any of the participants in some embodiments. The process in some embodiments prevents such signals from being identified as priority signals.

When the process determines (at 1310) that there are not more than N received audio signals available to be prioritized after excluding such signals, the process 1300 identifies (at 1315) all remaining available received audio signals as priority audio signals. For instance, in the example scenario illustrated by FIG. 11, only two participants are speaking while the number N is determined to be a three and thus the two audio signals of the two participants are identified as priority audio signals.

When the process determines (at 1310) that there are more than N received audio signals available to be prioritized after excluding such unavailable signals, the process 1300 prioritizes (at 1320) the remaining available received audio signals based on a set of criteria. As mentioned above, some embodiments use the average loudness of each received audio signal as a criterion. Calculating the average loudness of each received audio signal is described above by reference to FIG. 7.

Next, the process 1300 identifies (at 1325) the N high-priority audio signals as the priority audio signals. For example, if the number N is determined to be two and there are five received audio signals (e.g., five speaking participants in the audio conference), the process identifies the two highest prioritized audio signals out of the five audio signals as priority audio signals. The three non-priority audio signals are not to be sent to the participants of the audio conference nor are they to be included in the mixed audio signals to be sent to the participants.

Having described several conceptual processes that a focus point module performs, Section IV will now describe audio processing operations that a non-focus point module performs to exchange and process audio signals with a focus point module, and several example audio data packets that the focus point module and a non-focus point module utilize.

IV. NON-FOCUS POINT MODULE AND AUDIO PACKETS

A. Non-Focus Point Module

Figure 14:
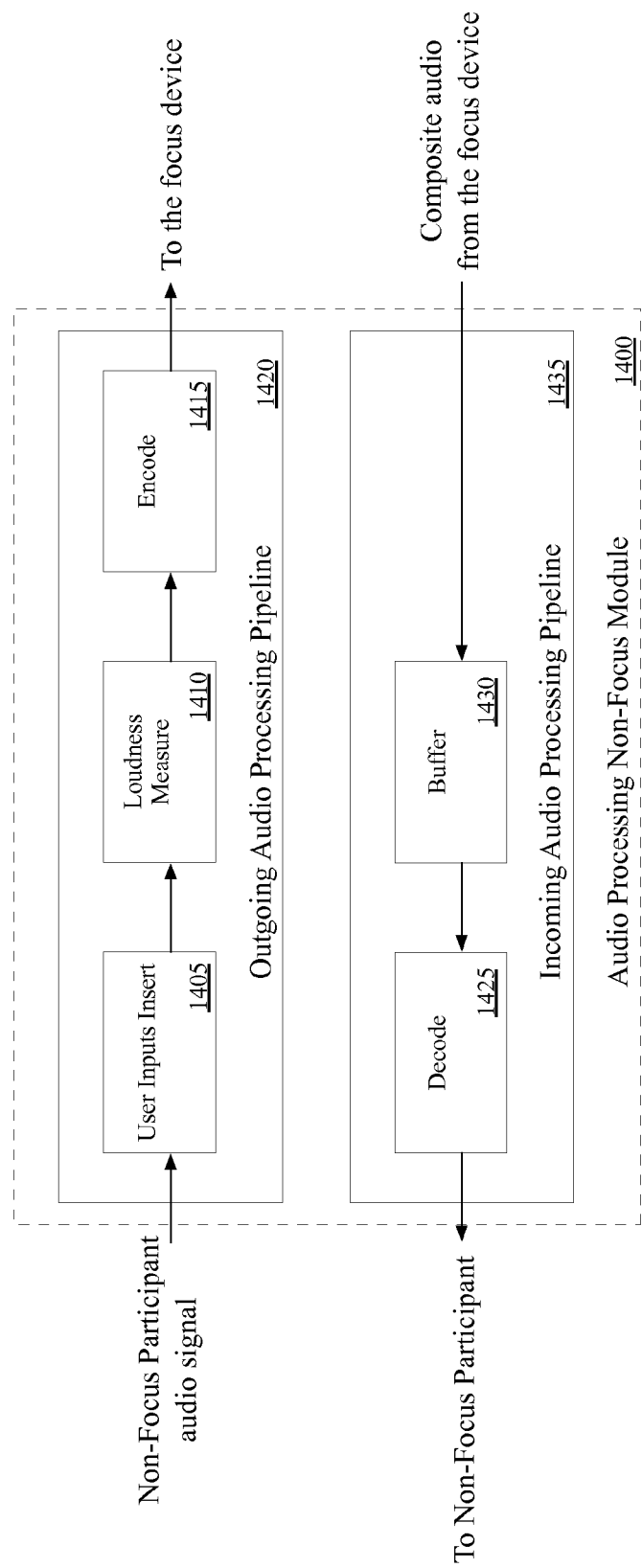
FIG. 14 illustrates a non-focus point module of some embodiments.

FIG. 14 conceptually illustrates an example set of operations that a non-focus point module 1400 of a non-focus device performs in an audio conference conducted through a focus point network connecting the computing devices of the participants in the conference. The non-focus point module performs the operations in order to process (1) an audio signal that the non-focus device locally captures and (2) an audio signal the non-focus device receives from the focus device. The non-focus point module sends the audio signal of the participant who is using the non-focus device to the focus device, and presents the audio in the audio signal received from the focus point device to the participant using the non-focus device during the audio conference.

FIG. 14 illustrates that the non-focus point module 1400 in some embodiments uses outgoing audio processing pipeline 1420 and incoming audio processing pipeline 1435 to process the audio signals. The outgoing audio processing pipeline 1420 includes user inputs inserting operation 1405, loudness measuring operation 1410, and encoding operation 1420. The incoming audio processing pipeline 1435 includes decoding operation 1425 and buffering operation 1430. Additional operations that may be performed by the non-focus module are not depicted in this figure for simplicity. For example, the non-focus module may perform additional buffering operation before and after the encoding operation 1415 in some embodiments.

At 1405, the non-focus point module receives the user inputs from the participant who is using the non-focus device. Such inputs might include, for example, the participant's selection of other participant(s) whose audio should be muted. This selection may involve clicking a mouse button or tapping a touchscreen to select a UI item, selecting an option through keyboard input, etc. The non-focus point module also receives the audio signal of the participant (i.e., the audio locally captured and converted into an audio signal by the non-focus device) and appends user inputs (e.g., muting instructions) to the audio signal. As described above, the audio signal in some embodiments is a stream of audio data packets each of which includes metadata in addition to audio data. The non-focus point module appends the user inputs to the audio data packets as a form of metadata in some embodiments.

Next, at 1410, the non-focus point module measures loudness of the audio of the participant. The non-focus point module in some embodiments examines the audio samples in each audio data packet and measures the average volume level for the packet. For instance, the non-focus point module takes the amplitude (e.g., in decibels) of each sample and averages the amplitudes (e.g., by taking a mean or a median amplitude) over a duration of time that the samples in the packet represent (e.g., 20 milliseconds). The non-focus point module appends the measured loudness in a form of metadata to the audio data packets in some embodiments. At 1415, the non-focus point module then encodes the audio signal and sends the encoded signal to the focus point module of the focus device.

On the incoming audio processing side, at 1430, the non-focus point module buffers a composite audio signal (or an unmixed signal) received from the focus point module of the focus device. As described above, the signal from the focus point module is encoded using an algorithm appropriate for the non-focus point module. At 1425, the non-focus point module decodes the buffered signal and sends it to the participant. The decoded signal will be played out for the participant by an audio output device, such as a speaker or speakers.

B. Audio Packets

FIG. 15 illustrates an example audio data packet 1500 that some embodiments use to send audio data from a focus device to a non-focus device in an audio conference conducted through a focus point network. These embodiments use the audio packet 1500 to send a mixed audio signal to a particular participant in the audio conference. In some embodiments, the packet 1500 is an RTP (Real-time Transport Protocol) packet that includes RTP headers 1505, mixed audio data 1510, and source participants list 1515. One of ordinary skill in the art will recognize that packets implemented in any other protocol that is suitable for sending data over a network (e.g., the Internet) can be utilized to send audio data from a focus device to a non-focus device.

The RTP headers 1505 in some embodiments include various data and information for the recipient device to use. For example, the headers 1500 may include a list of the participants whose audio is included in the mixed audio data 1510.

The mixed audio data 1510 in some embodiments contains the audio of several participants in a form of audio samples representing a duration of time (e.g., 20 milliseconds) of the audio conference.

The source participants list 1515 is metadata containing a list of the participants whose audio is included in the mixed audio data 1510. This metadata is appended to the packet by the focus device in some embodiments when this list is not included in the headers 1505.

FIG. 16 illustrates an example audio data packet 1600 that some embodiments use to send audio data from a non-focus point module to a focus point module in an audio conference conducted through a focus point network. These embodiments use the audio packet 1600 to send an audio signal (e.g., as a stream of audio data packets) to the focus point module. As shown, the audio packet 1600 includes RTP headers 1605, audio data 1610, loudness metadata 1615, and user inputs metadata 1620. One of ordinary skill in the art will recognize that packets implemented in any other protocol that is suitable for sending data over a network (e.g., the Internet) can be utilized to send audio data from a non-focus device to a focus device.

The RTP headers 1605 are similar to the RTP headers 1505 and include various data and information for the recipient device to use. For instance, the headers 1605 in some embodiments include the unique identification of the source (e.g., the identification of the computing device that generates the audio data 1610) of the packet 1600. This unique identification may be used as a criterion to prioritize audio signals of the participants of an audio conference in some embodiments.

The audio data 1610 is audio data containing the audio of the participant using the non-focus device in a form of audio samples representing a duration of time (e.g., 20 milliseconds) of the audio conference.

The loudness 1615 is metadata containing loudness information (e.g., sound pressure level measured in decibels). In some embodiments, the loudness information includes an average (e.g., mean or median) loudness over a duration of time that the audio samples in the audio data 1610 represent. This metadata is appended to the packet by a non-focus device in some embodiments. A focus point module uses this information to calculate and maintain a running loudness average of an audio signal of a participant in the audio conference.

The user inputs 1620 is metadata containing user inputs such as muting instructions specifying a list of participants that a particular participant wishes to mute. This metadata is appended to the packet by a non-focus point module. A focus point module uses the metadata to find out which participant's audio is muted with respect to another participant.

The packets 1500 and 1600 are described above for some embodiments of invention. One of ordinary skill in the art will realize that in other embodiments these packets may be used differently. For instance, in some embodiments, the packet 1600 is used to send audio data from a focus device to a non-focus device when the audio signal carrying the audio data does not have to be mixed with other audio signals before being sent to the non-focus device.

Having described so far the audio processing operations performed by focus and non-focus point modules of a focus point network in an audio conference to save computational resources of the focus device, Section V will now describe an example environment where these resource-saving operations is performed.

V. DUAL NETWORKS FOR GAME AND CONFERENCE DATA

Some embodiments use several different types of networks to relay several different types of media content among several different computing devices. The media content of some embodiments is data that a computing device can process in order to provide a presentation of the media content to a user of the device. Examples of types of such media content include audio data, video data, text data, picture data, game data, and/or other media data.

In some embodiments, two different networks relay media content of two different types among multiple computing devices. Specifically, in some embodiments, a first network routes among the computing devices one type of media data content (e.g., game data), while a second network routes among the computing devices another type of media data content (e.g., audio and/or video data of game participants).

Figure 17:
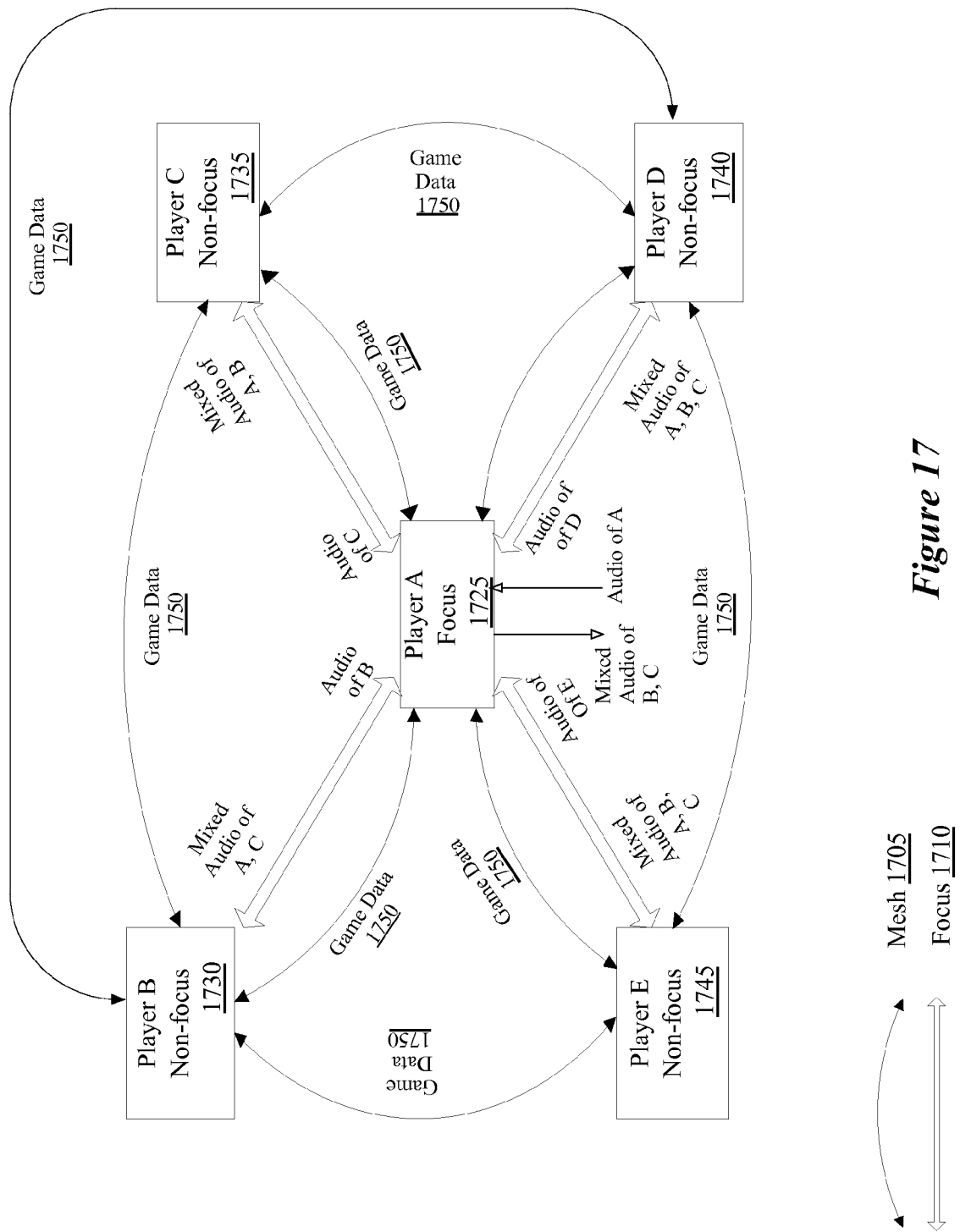
FIG. 17 illustrates some embodiments that use two networks to relay game data and audio data between multiple computing devices.

FIG. 17 illustrates one example of a game session that is facilitated through such a dual network approach. In this example, a first network 1705 is a mesh network for routing game data and a second network 1710 is a focus network for routing audio data. The five players A, B, C, D and E are (1) playing a game together (i.e., exchanging game data) using their computing devices 1725-1745 connected through the mesh network 1705 and (2) having an audio conference through the focus point network 1710 with the computing device 1725 serving as the focus device. The focus device 1725 improves its audio processing performance by limiting the number of received audio signals it uses to generate composite audio signals.

In order to play a game together, the game data 1750 of each computing device must reach each of the other computing devices of the participants in the game. Without the game data for a first player, the first player's representation in the game (e.g., a car in an auto racing game) will not be properly rendered on a second player's computing device. Different games will transmit different data between the participants. For instance, an auto racing game will transmit the speed, track position, direction, fuel level, etc. of a player's car as game data. Other types of multiplayer games will transmit different game data about the players' representations in the game.

A mesh network provides a reliable way of exchanging data (e.g., the game data) among multiple computing devices in the network even though some computing devices are not directly connected by a network connection. As shown, the computing devices 1735 and 1745 of players C and E which are not directly connected to each other in the mesh network 1705 can exchange game data between them through the mesh network 1705 (through any one of the computing devices 1725, 1730, or 1740).

While playing the game, the five players A-E are concurrently participating in the audio conference through the focus point network 1710 using their computing devices (i.e., the computing devices are exchanging audio data through the focus point network 1710). Since computing device 1725 of player A is designated as the focus point of the focus network 1710, the computing device 1725 is connected to each of the other computing devices 1730-1745 through the focus network 1710. Each of the computing devices 1730-1745 is connected only to the focus device 1725 (in the focus network).

The focus device 1725 receives the audio signals from the non-focus computing devices 1730-1745 of the players B-E, composites (e.g., mixes) the received audio signals along with the locally captured audio signal of the player A, distributes the composite audio signals to the computing devices 1730-1745, and provides a local playback of a composite audio signal for the player A. As mentioned above, the focus device 1725 in some embodiments improves its audio processing performance by limiting the number of the received audio signals it uses to generate composite audio signals.

In operation, the players A-E exchange the game data through the mesh network 1705. The players also exchange audio data through the focus network 1710. The focus device 1725 identifies that it can process three received audio signals based on its available computational resources after allocating certain amount of resources (e.g., an 80% of the central processing unit or a 75% of random access memory, etc.) to execute the game application. The non-focus devices 1730-1745 send their audio signals to the focus point computing device 1725 through a network (e.g., through the Internet). The focus device 1725 locally captures audio signals from the player A. The focus device then identifies three audio signals of the players A, B, and C as the signals to be processed because these three players are speaking the loudest at that instance. The focus device 1725 then generates composite signals using the three identified received signals. For the player A, the composite signal includes the audio of the participants B and C because the player A does not get its own audio. Similarly, for the player B, the composite signal includes the audio of the players A and C. For the player C, the composite signal includes the audio of the players A and B. For the players D and E, the composite signals include the audio of all three participants A, B, and C whose audio signals are identified as the signals to be processed. The focus device distributes the composite audio signals to the non-focus devices 1730-1745 of the participants B-E and provides a local playback of the composite signal to the participant A.

VI. EXAMPLES OF SOFTWARE APPLICATIONS

As described above, a computing device in some embodiments exchange audio data with other computing devices in an audio conference conducted through a focus point network. In some cases, the computing device acts as the focus device, receiving audio data from non-focus devices, processing the audio data, and distributing the processed audio data to non-focus devices. In other cases, the computing device is a non-focus device, sending its audio data and receiving processed audio data from a focus device.

Figure 18:
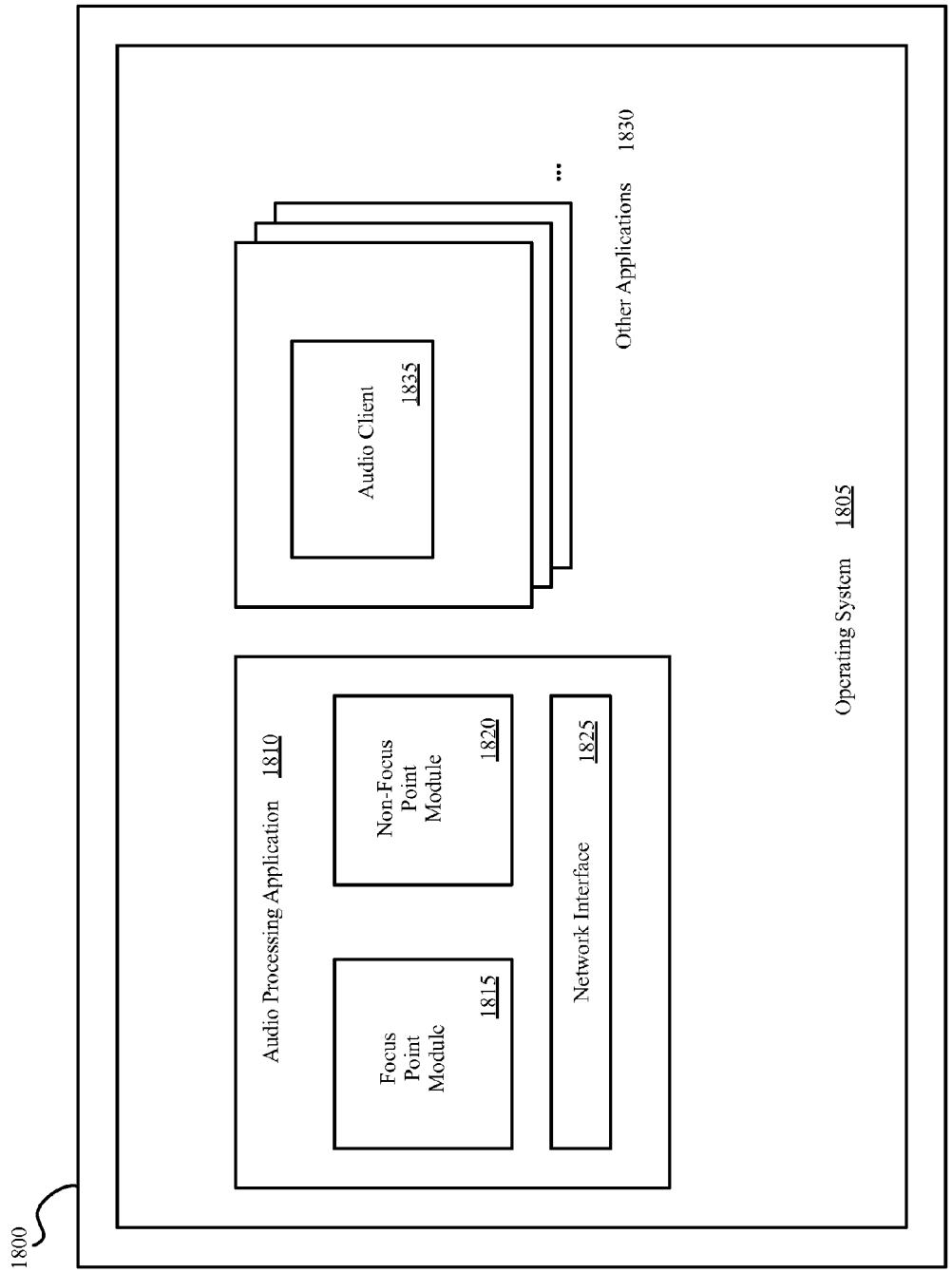
FIG. 18 illustrates an example of the architecture of the software applications of some embodiments

A computing device of some embodiments includes several modules to perform its focus/non-focus operations. FIG. 18 illustrates an example of some such modules for some embodiments of the invention. Specifically, this figure illustrates the software architecture 1800 of a computing device of some embodiments. The modules in this architecture allow the computing device to connect to other computing devices to exchange audio data in a multi-participant audio conference.

As shown in FIG. 18, the architecture 1800 includes an operating system 1805, an audio processing application 1810, other applications 1830, and an audio client 1835 that is part of one of the other applications. This figure also illustrates that the audio processing application 1810 includes three modules: (1) focus point module 1815 (2) non-focus point module 1820, and (3) network interface module 1825. The functions of each module or application will be described first and then several possible configurations in which these applications and modules can operate will be described further below.

The other applications 1830 are applications that execute on the computing device. For example, one of these applications may be a game application that the computing device uses to participate in a game session for a single player or multiplayer game. This application sets up a multiplayer game by inviting other computing devices in some embodiments. In other embodiments, the application can join a multiplayer game session that has already been going on among similar applications running on other computing devices.

The game application in some embodiments can use its audio client 1835 to start or join an audio conference (e.g., an audio conference session) during the multiplayer game session. In other words, the audio client 1835 allows the computing device to participate, during a game session, in an audio conference with other game participants. To participate in an audio conference during a game session, the computing device can initiate a multi-participant conference or can join a multi-participant conference that has been already set up by other computing devices.

During a multi-participant conference session, the audio processing application 1810 uses the focus point module 1815 when the computing device is serving as the focus device in the audio conference, or the non-focus point module 1820 when the computing device is not serving as the focus device. The focus point module 1815 performs focus point audio processing operations when the computing device is the focus device for a multi-participant audio conference. For example, the focus point module 1815 (1) receives audio data from non-focus point modules of non-focus devices in the audio conference and (2) generates composite audio data (i.e., mixed audio data) and distributes composite data to non-focus devices. Several examples of such audio/video processing operations are described above by reference to FIGS. 8-11.

On the other hand, the non-focus point module 1820 performs non-focus point audio processing operations when the computing device is not the focus device of the audio conference. For instance, the non-focus point module 1820 sends audio data to the focus point module of the focus device through the network interface module 1825. An example set of non-focus audio processing operations performed by a non-focus device is described above by reference to FIG. 14.

The network interface module 1825 performs several operations. The network interface module 1825 receives data (e.g., audio data.) from the audio processing applications 1810 of the other computing devices, and routes the received data to the focus point module 1815 or the non-focus point module 1820 of the computing device. The network interface module 1825 also receives data (e.g., audio data) from the focus point module 1815 (when the device is a focus device) of the computing device and routes this data to other destination computing devices through the network connecting this computing device to the other computing devices. The network interface module 1825 receives data (e.g., audio data) from the non-focus point module 1820 (when the device is a non-focus device) of the computing device and routes this data to the focus device through the network connecting this computing device to another computing device serving as the focus device.

As shown in FIG. 18, the audio processing application 1810 in some embodiments is separate from the other applications so that it can be used by those applications. In other embodiments, the audio processing application 1810 may be a module within another application. For example, all modules 1815, 1820, and 1825 of the audio application 1810 may be combined under one module and become a part of the audio client 1835 or the game application. In some embodiments, the applications and modules may be implemented using one or more Application Programming Interfaces (APIs) so that the applications and modules can be accessed through these APIs. APIs are described in detail further below in Section VII.

VII. APPLICATION PROGRAMMING INTERFACES

As described above, software applications (e.g., an audio processing application) and modules (e.g. a focus point module) may be implemented using one or more Application Programming Interfaces (APIs) so that the applications and modules can be accessed through these APIs. Some of the functions described in the sections above are implemented through APIs such as are described in the following section. In some embodiments, some of these APIs are exposed to application developers who build applications that make calls to the APIs in order to access various functions. Functions accessed through APIs may include, for example, audio/video conferencing during those applications are running, etc.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 19:
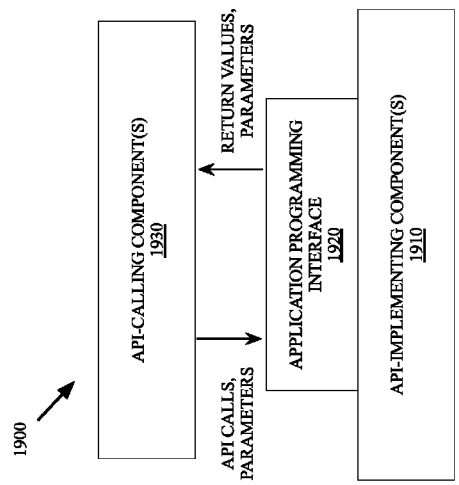
FIG. 19 illustrates an API architecture used in some embodiments.

FIG. 19 is a block diagram illustrating an API architecture, which may be used in some embodiments of the invention. As shown in FIG. 19, the API architecture 1900 includes the API-implementing component 1910 (e.g., an operating system, a library, a device driver, an API, an application program, software or other module) that implements the API 1920. The API 1920 specifies one or more functions, methods, classes, objects, protocols, data structures, formats and/or other features of the API-implementing component that may be used by the API-calling component 1930. The API 1920 can specify at least one calling convention that specifies how a function in the API-implementing component receives parameters from the API-calling component and how the function returns a result to the API-calling component. The API-calling component 1930 (e.g., an operating system, a library, a device driver, an API, an application program, software or other module), makes API calls through the API 1920 to access and use the features of the API-implementing component 1910 that are specified by the API 1920. The API-implementing component 1910 may return a value through the API 1920 to the API-calling component 1930 in response to an API call.

It will be appreciated that the API-implementing component 1910 may include additional functions, methods, classes, data structures, and/or other features that are not specified through the API 1920 and are not available to the API-calling component 1930. It should be understood that the API-calling component 1930 may be on the same system as the API-implementing component 1910 or may be located remotely and accesses the API-implementing component 1910 using the API 1920 over a network. While FIG. 19 illustrates a single API-calling component 1930 interacting with the API 1920, it should be understood that other API-calling components, which may be written in different languages (or the same language) than the API-calling component 1930, may use the API 1920.

The API-implementing component 1910, the API 1920, and the API-calling component 1930 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 20:
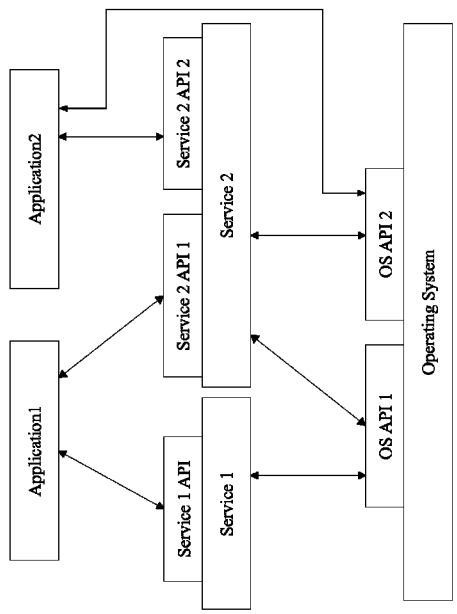
FIG. 20 illustrates an example of how APIs may be used according to some embodiments.

In FIG. 20, an example of how APIs may be used, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

VIII. COMPUTING DEVICE

Many of the above-described processes and modules are implemented as software processes that are specified as a set of instructions recorded on a non-transitory computer readable storage medium (also referred to as "computer readable medium" or "machine readable medium"). These instructions are executed by one or more computational elements, such as one or more processing units of one or more processors or other computational elements like Application-Specific ICs ("ASIC") and Field Programmable Gate Arrays ("FPGA"). The execution of these instructions causes the set of computational elements to perform the actions indicated in the instructions. Computer is meant in its broadest sense, and can include any electronic device with a processor. Examples of non-transitory computer readable media include, but are not limited to, CD-ROMs, flash drives, RAM chips, hard drives, EPROMs, etc. The computer readable media do not include carrier waves and/or electronic signals passing wirelessly or over wired connection.

In this specification, the term "software" includes firmware residing in read-only memory or applications stored in magnetic storage that can be read into memory for processing by one or more processors. Also, in some embodiments, multiple software inventions can be implemented as parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computing devices define one or more specific machine implementations that execute and perform the operations of the software programs.

Figure 21:
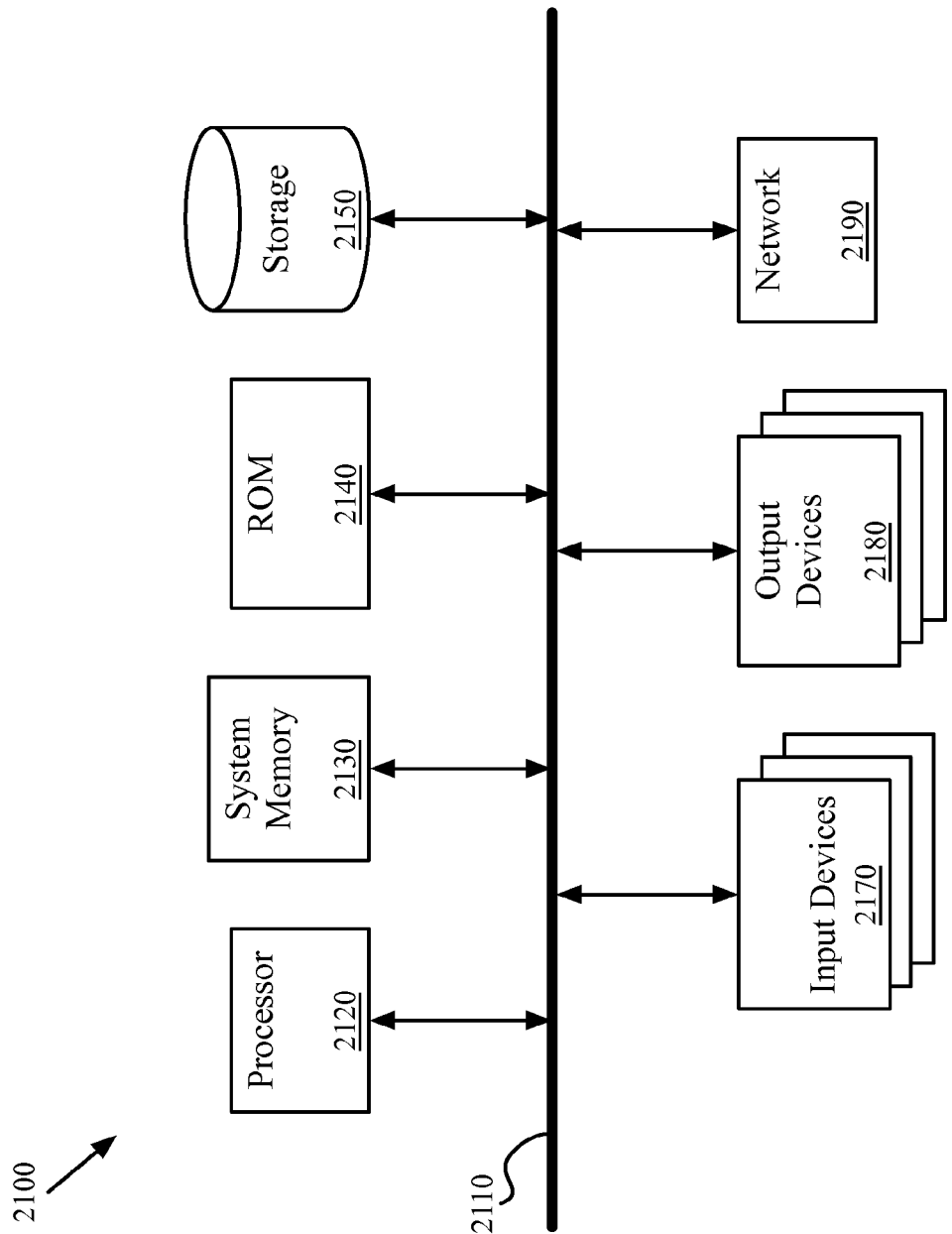
FIG. 21 illustrates a computing device with which some embodiments of the invention are implemented.

FIG. 21 conceptually illustrates a computing device 2100 with which some embodiments of the invention are implemented. For example, the computing device described above by reference to FIGS. 1-18 may be at least partially implemented using sets of instructions that are run on the computing device 2100. As another example, the processes described by reference to FIGS. 3, 12 and 13 may be at least partially implemented using sets of instructions that are run on the computing device 2100.

Such a computing device includes various types of non-transitory computer readable media and interfaces for various other types of non-transitory computer readable mediums. Computing device 2100 includes a bus 2110, at least one processing unit (e.g., a processor) 2120, a system memory 2130, a read-only memory (ROM) 2140, a permanent storage device 2150, input devices 2170, output devices 2180, and a network connection 2190. The components of the computing device 2100 are electronic devices that automatically perform operations based on digital and/or analog input signals. The various examples of user inputs described by reference to FIGS. 4, 6, 12, 14, and 16 may be at least partially implemented using sets of instructions that are run on the computing device 2100 and displayed using the output devices 2180.

One of ordinary skill in the art will recognize that the computing device 2100 may be embodied in other specific forms without deviating from the spirit of the invention. For instance, the computing device may be implemented using various specific devices either alone or in combination. For example, a local personal computer (PC) may include the input devices 2170 and output devices 2180, while a remote PC may include the other devices 2110-2150, with the local PC connected to the remote PC through a network that the local PC accesses through its network connection 2190 (where the remote PC is also connected to the network through a network connection).

The bus 2110 collectively represents all system, peripheral, and chipset buses that communicatively connect the numerous internal devices of the computing device 2100. In some cases, the bus 2110 may include wireless and/or optical communication pathways in addition to or in place of wired connections. For example, the input devices 2170 and/or output devices 2180 may be coupled to the system 2100 using a wireless local area network (W-LAN) connection, Bluetooth®, or some other wireless connection protocol or system.

The bus 2110 communicatively connects, for example, the processor 2120 with the system memory 2130, the ROM 2140, and the permanent storage device 2150. From these various memory units, the processor 2120 retrieves instructions to execute and data to process in order to execute the processes of some embodiments. In some embodiments the processor includes an FPGA, an ASIC, or various other electronic components for execution instructions.

The ROM 2140 stores static data and instructions that are needed by the processor 2120 and other modules of the computing device. The permanent storage device 2150, on the other hand, is a read-and-write memory device. This device is a non-volatile memory unit that stores instructions and data even when the computing device 2100 is off. Some embodiments of the invention use a mass-storage device (such as a magnetic or optical disk and its corresponding disk drive) as the permanent storage device 2150.

Other embodiments use a removable storage device (such as a floppy disk, flash drive, or CD-ROM) as the permanent storage device. Like the permanent storage device 2150, the system memory 2130 is a read-and-write memory device. However, unlike storage device 2150, the system memory 2130 is a volatile read-and-write memory, such as a random access memory (RAM). The system memory stores some of the instructions and data that the processor needs at runtime. In some embodiments, the sets of instructions and/or data used to implement the invention's processes are stored in the system memory 2130, the permanent storage device 2150, and/or the read-only memory 2140. For example, the various memory units include instructions for processing multimedia items in accordance with some embodiments.

The bus 2110 also connects to the input devices 2170 and output devices 2180. The input devices 2170 enable the user to communicate information and select commands to the computing device. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 2180 include printers, electronic display devices that display still or moving images, and electronic audio devices that play audio generated by the computing device. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computing device.

Finally, as shown in FIG. 21, bus 2110 also couples computer 2100 to a network 2190 through a network adapter (not shown). In this manner, the computer can be a part of a network of computers (such as a local area network ("LAN"), a wide area network ("WAN"), an Intranet, or a network of networks, such as the Internet. For example, the computer 2100 may be coupled to a web server (network 2190) so that a web browser executing on the computer 2100 can interact with the web server as a user interacts with a GUI that operates in the web browser.

Figure 22:
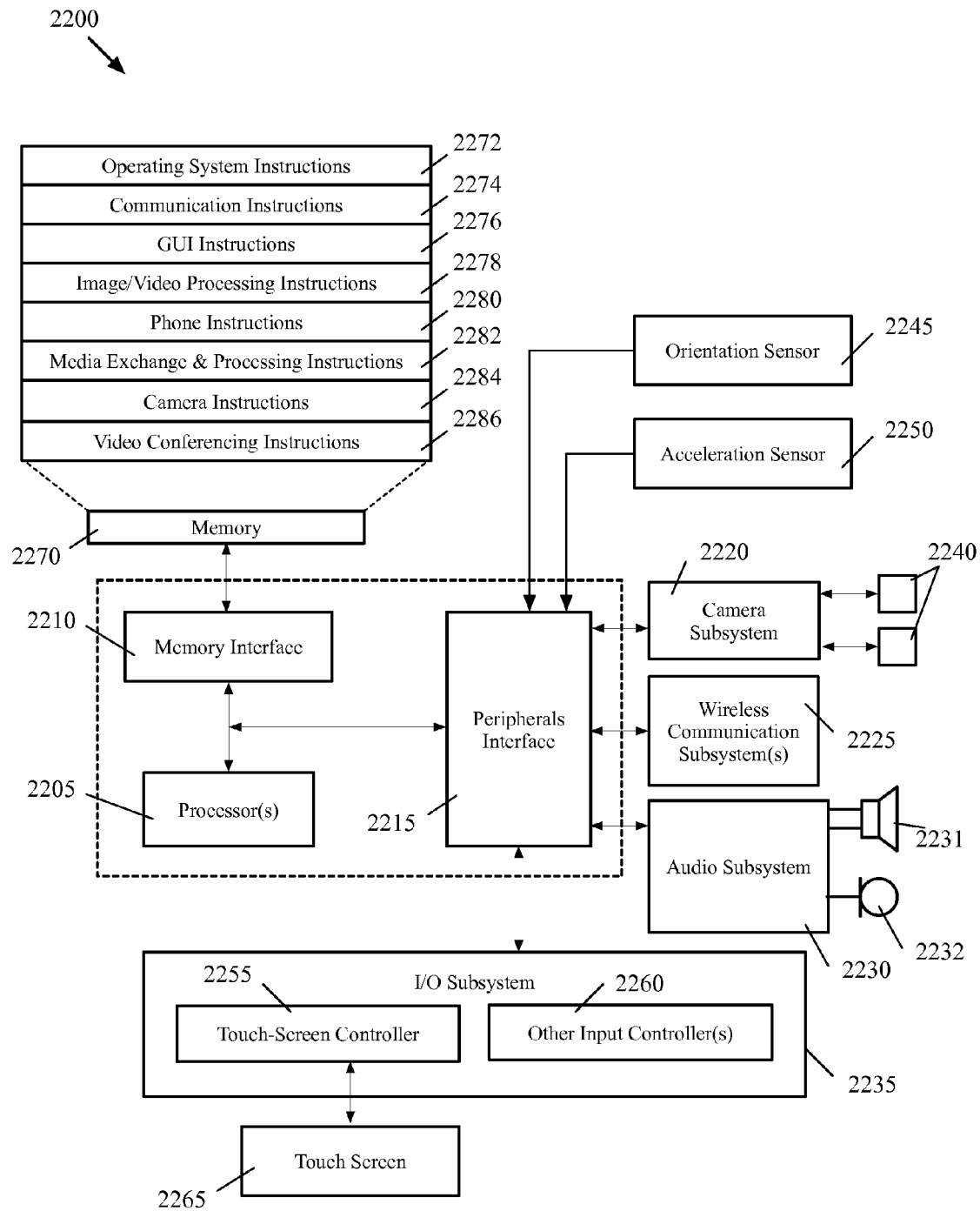
FIG. 22 conceptually illustrates a computing device with which some embodiments of the invention are implemented.

FIG. 22 conceptually illustrates a computing device 2200 with which some embodiments of the invention are implemented. Specifically, FIG. 22 is an example of a mobile computing device. The implementation of a mobile computing device can include one or more processing units 2205, memory interface 2210 and a peripherals interface 2215. Each of these components that make up the computing device can be separate components or integrated in one or more integrated circuits. These various components can also be coupled together by one or more communication buses or signal lines.

The peripherals interface 2215 can be coupled to various sensors and subsystems, including a camera subsystem 2220, a wireless communication subsystem(s) 2225, audio subsystem 2230, I/O subsystem 2235, etc. The peripherals interface 2215 enables communication between processors and peripherals. Peripherals such as an orientation sensor 2245 or an acceleration sensor 2250 can be coupled to the peripherals interface 2215 to facilitate the orientation and acceleration functions.

The camera subsystem 2220 can be coupled to one or more optical sensors 2240, e.g., a charged coupled device (CCD) optical sensor, a complementary metal-oxide-semiconductor (CMOS) optical sensor. The camera subsystem 2220 coupled with the sensors may facilitate camera functions, such as image and/or video data capturing. The camera subsystem 2220 can be used to generate video data for an A/V conference.

Wireless communication subsystems 2225 may serve to facilitate communication functions. Wireless communication subsystems 2225 may include one or more transceivers (with each transceiver including a receiver and transmitter), such as one or more radio or optical transceivers, etc. For instance, in some embodiments, the wireless communication subsystems 2225 include a cellular radio transceiver (e.g., 3G or 4G transceiver), a Bluetooth transceiver, and a Wi-Fi transceiver. Through their data channel circuits that utilize standard data protocols (such as IP layer protocols), such transceivers allow the mobile device to connect to different communication networks and different computing devices. For instance, in some embodiments, the Wi-Fi transceiver allows the mobile device to connect to both the mesh and focus networks discussed above, in order to exchange game data along the mesh network and audio data along the focus network. Alternatively, the mobile device in some embodiments can connect to different networks through different transceivers. For example, the Wi-Fi transceiver can be used in some embodiments to connect to mesh network while the cellular radio transceiver can be used in some embodiments to connect to the focus point network, or vice versa. In some embodiments, the different transceivers share hardware resources on the mobile device. For instance, two or more of the transceivers are fully or partially implemented by one or more processing units of the processor 2205 in some embodiments.

The audio subsystem 2230 is coupled to a speaker 2231 and a microphone 2232 to facilitate voice-enabled functions, such as voice recognition, digital recording, etc. I/O subsystem 2235 involves the transfer between input/output peripheral devices, such as a display, a touch screen, etc., and the data bus of the CPU through the Peripherals Interface. I/O subsystem 2235 can include a touch-screen controller 2255 and other input controllers 2260 to facilitate these functions. Touch-screen controller 2255 can be coupled to the touch screen 2265 and detect contact and movement on the screen using any of multiple touch sensitivity technologies. Other input controllers 2260 can be coupled to other input/control devices, such as one or more buttons.

Memory interface 2210 can be coupled to memory 2270, which can include high-speed random access memory and/or non-volatile memory such as flash memory. Memory can store an operating system (OS) 2272. The OS 2272 can include instructions for handling basic system services and for performing hardware dependent tasks.

Memory can also include communication instructions 2274 to facilitate communicating with one or more additional devices; graphical user interface instructions 2276 to facilitate graphic user interface processing; image/video processing instructions 2278 to facilitate image/video-related processing and functions; phone instructions 2280 to facilitate phone-related processes and functions; media exchange and processing instructions 2282 to facilitate media communication and processing-related processes and functions; camera instructions 2284 to facilitate camera-related processes and functions; and video conferencing instructions 2286 to facilitate video conferencing processes and functions. The above identified instructions need not be implemented as separate software programs or modules. Various functions of mobile computing device can be implemented in hardware and/or in software, including in one or more signal processing and/or application specific integrated circuits.

As mentioned above, some embodiments include electronic components, such as microprocessors, storage and memory that store computer program instructions in a non-transitory machine-readable or computer-readable medium (alternatively referred to as computer-readable storage media, machine-readable media, or machine-readable storage media). Some examples of such non-transitory computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The non-transitory computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "computing device", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium" and "computer readable media" are entirely restricted to non-transitory, tangible, and physical objects that store information in a form that is readable by a computer. These terms exclude any wireless signals, wired download signals, and/or any other ephemeral signals.

It should be recognized by one of ordinary skill in the art that any or all of the components of computing device 2100 or computing device 2200 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For instance, while the examples shown illustrate many individual modules as separate blocks (e.g., the focus network module 2410, the mesh network module 2430, etc.), one of ordinary skill in the art would recognize that some embodiments may combine these modules into a single functional block or element. One of ordinary skill in the art would also recognize that some embodiments may divide a particular module into multiple modules.

In addition, a number of the figures (including FIGS. 3, 12 and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, as described above, the device assessor (e.g., the device assessor 426) in some embodiments determines a maximum number of the received audio signals that a focus point module should process based on the processing capacity of the focus device. However, in other embodiments, the device assessor performs differently. For instance, in some embodiments, the device assessor specifies a maximum number of composite audio streams to generate (e.g., a maximum number of audio processing pipelines such as the processing pipelines 445-455) instead of specifying a maximum number of the received audio signals for processing. In such embodiments, the focus point module then figures out which of the received audio streams it should process based on that maximum number of composite audio streams to generate. In some of these embodiments, the focus point module makes this decision after analyzing control metadata (e.g., user inputs such as muting instructions, etc.) for the audio streams received or captured by the focus device.

In addition, although some embodiments are described above in the context of an audio conference or an audio conference during a multi-participant game, some embodiments are used to optimize audio processing during a video conference. Also, some embodiments use similar techniques to optimize video processing during a video conference. U.S. Patent Publication 2006/0245378 discloses examples of focus point modules that perform both audio and video compositing operations during a video conference. This published application is incorporated herein by reference. In view of the foregoing, one of ordinary skill in the art would understand that the invention is not to be limited by the foregoing illustrative details, but rather is to be defined by the appended claims.

What is claimed is:

1. A focus point module for execution on a focus computing device that engages in a multi-participant communication session with a plurality of non-focus computing devices, the focus point module receiving audio streams from the plurality of non-focus computing devices and from the focus computing device, the focus point module comprising:
   a device assessor for performing an operation to identify, based on a first assessment of computational resources of the focus computing device, a first particular number that is less than a total number of received audio streams, wherein the first particular number represents a maximum number of audio streams for compositing by the focus computing device;
   a signal assessment module for selecting the first particular number of the received audio streams for compositing in order to reduce an amount of the computational resources of the focus computing device that is used for the compositing; and
   an audio processing module for generating a set of composite streams from the selected audio streams, wherein each participant computing device receives a composite stream from the set of composite streams during the communication session,
   wherein the device assessor performs the operation during the communication session to identify, based on a second assessment of the computational resources of the focus computing device, a second particular number that represents the maximum number of audio streams for compositing by the focus computing device, wherein the signal assessment module selects the second particular number of the received audio streams for compositing, wherein the second particular number is different from the first particular number and the first and second particular numbers can vary from session to session.

2. The focus point module of claim 1, wherein a number of generated composite streams is less than the total number of participant computing devices in the communication session and at least two participant computing devices receive a same composite stream.

3. The focus point module of claim 1, wherein a number of generated composite streams is different from the first particular number.

4. The focus point module of claim 1, wherein the signal assessment module determines which received audio streams to select for compositing based on a set of criteria.

5. The focus point module of claim 4, wherein the set of criteria relates to attributes of audio content in the received audio streams.

6. The focus point module of claim 5, wherein the attributes of the audio content comprise volume levels of the audio content in the received audio streams.

7. The focus point module of claim 5, wherein the attributes of the audio content comprise volume levels of the audio content in the received audio streams and durations that the volume levels exceed a threshold.

8. The focus point module of claim 5, wherein the attributes of the audio content are received as a form of metadata along the received audio streams from the participant computing devices in the communication session.

9. The focus point module of claim 3, wherein the set of criteria relates to non-audible inputs provided by the participant computing devices in the communication session.

10. The focus point module of claim 9, wherein the non-audible inputs comprise a particular device that is muted by the rest of the participant computing devices.

11. The focus point module of claim 10, wherein the number of generated composite streams is less than the total number of participant computing devices in the communication session because of non-audible inputs provided by the participant computing devices in the communication session.

12. The focus point module of claim 9, wherein the non-audible inputs are received as a form of metadata along the received audio streams from the participant computing devices in the communication session.

13. The focus point module of claim 4, wherein the signal assessment module changes the selected set of received audio streams for compositing when behavior of the participants during the communication session changes.

14. A method for a focus computing device that engages in a multi-participant communication session with a plurality of non-focus computing devices, the method comprising:
receiving audio streams from the plurality of non-focus computing devices and from the focus computing device;
based on a first assessment of computational resources of the focus computing device, identifying a first number that represents a maximum number of audio streams for compositing by the focus computing device;
selecting the first number of received audio streams for the focus computing device to process, the first number being less than a total number of participant computing devices;
generating at least two different composite audio streams for at least two different participant computing devices using no more than the selected number of received audio streams;
sending each participant computing device the composite audio stream for that device;
based on a second assessment of the computational resources of the focus computing device during the communication session, identifying a second number that represents the maximum number of audio streams for compositing by the focus computing device, wherein the second number is different from the first number and the first and second numbers can vary from session to session; and
selecting the second number of received audio streams for the focus computing device to process.

15. The method of claim 14 further comprising changing the set of received audio streams that are selected for compositing based on changing behavior of participants during the communication session.

16. The method of claim 14, wherein said selecting is further based on a set of criteria.

17. The method of claim 16, wherein the set of criteria relates to attributes of audio content in the received audio streams.

18. The method of claim 17, wherein the attributes of audio content comprise volume levels of the audio content in the received audio streams.

19. The method of claim 17, wherein the attributes of the audio content comprise durations that the volume levels exceed a threshold.

20. The method of claim 16, wherein the set of criteria relates to non-audible inputs provided by the participant computing devices in the communication session.

21. The method of claim 20, wherein the non-audible inputs comprise a participant computing device that is muted by the rest of the participant computing devices.

22. A non-transitory computer readable medium of a focus computing device that engages in a multi-participant communication session with a plurality of non-focus computing devices, the focus computing device receiving audio streams from the plurality of non-focus computing devices and from a participant using the focus computing device, the computer readable medium storing a computer program that is executable by at least one processing unit, the computer program comprising sets of instructions for:
based on a first assessment of computational resources of the focus computing device, identifying a first number that represents a maximum number of audio streams for compositing by the focus computing device;
selecting a first subset of the received audio streams for compositing, wherein the first subset contains the first number of the received audio streams, wherein the first number is less than a total number of participant computing devices in order to reduce an amount of the computational resources of the focus computing device that is used for compositing;
generating a set of composite streams from the selected audio streams, wherein each participant computing device receives a composite stream from the set of composite streams during the communication session;
based on a second assessment of the computational resources of the focus computing device during the communication session, identifying a second number that represents the maximum number of audio streams for compositing by the focus computing device, wherein the second number is different than the first number and the first and second numbers can vary from session to session; and
selecting a second subset of the received audio streams for compositing, wherein the second subset contains the second number of the received audio streams.

23. The non-transitory computer-readable medium of claim 22, wherein the computer program further comprises a set of instructions for determining which received audio streams to select for compositing based on a set of criteria.

24. The non-transitory computer-readable medium of claim 23, wherein the set of criteria relates to attributes of audio content in the received audio streams.

25. The non-transitory computer-readable medium of claim 23, wherein the set of criteria relates to non-audible inputs provided by the participant computing devices in the communication session.

* * * * *